United States Patent [19]
Tiedemann, Jr. et al.

[11] Patent Number: 5,914,950
[45] Date of Patent: Jun. 22, 1999

[54] METHOD AND APPARATUS FOR REVERSE LINK RATE SCHEDULING

[75] Inventors: Edward G. Tiedemann, Jr.; Tao Chen; Yu-Cheun Jou, all of San Diego, Calif.; Yu-Chuan Lin, Vancouver, Canada

[73] Assignee: Qualcomm Incorporated, San Diego, Calif.

[21] Appl. No.: 08/835,632

[22] Filed: Apr. 8, 1997

[51] Int. Cl.$^6$ .................................................. H04L 12/56
[52] U.S. Cl. .......................... 370/348; 370/395; 370/335
[58] Field of Search .................................... 370/335, 342, 370/441, 479, 329, 468, 252, 345, 346, 348, 330, 395

[56] References Cited

U.S. PATENT DOCUMENTS

| | | | |
|---|---|---|---|
| 4,763,322 | 8/1988 | Eizenhofer | 370/337 |
| 5,224,120 | 6/1993 | Schilling | 370/342 |
| 5,442,625 | 8/1995 | Gitlin et al. | 370/342 |
| 5,490,136 | 2/1996 | Sereno et al. | 370/342 |
| 5,537,410 | 7/1996 | Li | 370/465 |
| 5,619,492 | 4/1997 | Press et al. | 370/441 |
| 5,648,955 | 7/1997 | Jensen et al. | 370/252 |
| 5,729,534 | 3/1998 | Jokinen et al. | 370/280 |
| 5,734,646 | 3/1998 | I et al. | 370/335 |

*Primary Examiner*—Chau Nguyen
*Assistant Examiner*—Kenneth Vanderpuye
*Attorney, Agent, or Firm*—Russell B. Miller; Bruce W. Greenhaus; Truong T. Dinh

[57] ABSTRACT

In a communication system capable of variable rate transmission, scheduling of high speed data transmission improves utilization of the reverse link and decreases the transmission delay in data communication. Each remote station is assigned a maximum unscheduled transmission rate for the duration of the communication with a cell. A maximum scheduled transmission rate can be assigned by a channel scheduler for scheduled transmission of data traffic at high rates. The maximum scheduled transmission rate is assigned in accordance with a set of system goals, a list of system constraints, and collected information on the status of the communication network. Data is partitioned in data frames and transmitted over the reverse link at or below the maximum scheduled transmission rate which have been assigned to the scheduled user.

14 Claims, 11 Drawing Sheets

METHOD AND APPARATUS FOR REVERSE LINK RATE SCHEDULING

BACKGROUND OF THE INVENTION

I. Field of the Invention

The present invention relates to data communication. More particularly, the present invention relates to a novel and improved method and apparatus for reverse link rate scheduling in a communication system having a variable data transmission rate.

II. Description of the Related Art

A modern day communication system is required to support a variety of applications. One such communication system is a code division multiple access (CDMA) system which conforms to the "TIA/EIA/IS-95A Mobile Station-Base Station Compatibility Standard for Dual-Mode Wideband Spread Spectrum Cellular System", hereinafter referred to as the IS-95A standard. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein.

The IS-95A standard is designed to optimize voice communication and many important system design parameters are selected to achieve that goal. For example, since time delay between speakers cannot be tolerated, processing delays are sought to be minimized. Each user is assigned a transmission rate capable of carrying speech data for the duration of the call. Upon termination of the call, the assigned transmission rate can be reassigned to another user.

In the CDMA system, users communicate with one another through remote stations which, in turn, communicate with each other through one or more base stations. In this specification, base station refers to the hardware with which the remote stations communicate. Cell refers to the hardware or the geographic coverage area, depending on the context in which the term is used.

In the CDMA system, communications between users are conducted through one or more cells which are serviced by base stations. A first user on one remote station communicates to a second user on a second remote station, or a standard telephone, by transmitting voice data on the reverse link to a cell. The cell receives the voice data and can route the data to another cell or a public switched telephone network (PSTN). If the second user is on a remote station, the data is transmitted on the forward link of the same cell, or a second cell, to the second remote station. Otherwise, the data is routed through the PSTN to the second user on the standard phone system. In IS-95A systems, the forward link and the reverse link are allocated separate frequency and are independent of one another.

The remote station communicates with at least one cell during a communication. CDMA remote stations are capable of communicating with multiple cells simultaneously during soft handoff. Soft handoff is the process of establishing a link with a new cell before breaking the link with the previous cell. Soft handoff minimizes the probability of dropped calls. The method and system for providing a communication with a remote station through more than one cell during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein. Soft handoff impacts various aspects of the CDMA system design because considerations must be given to the status and capacity of each of the multiple cells involved in the soft handoff when a new allocation of resource is made.

In accordance with the IS-95A standard, each remote station is assigned a transmission rate of 28.8 Kbps on the reverse link for the duration of the communication with a cell. Using a rate ⅓ convolutional encoder, the data rate of each remote station approaches 9.6 Kbps. Although not specified by the IS-95A standard, higher data rates can by supported by the use of other code rates. For example, a data rate of 14.4 Kbps is achieved by using a rate ½ convolutional encoder.

The CDMA system is a spread spectrum communication system. The benefits of spread spectrum communication are well known in the art and can be appreciated by reference to the above cited references. The CDMA system must work within the pre-existing non-contiguous frequency allocation in the cellular band. By design, a CDMA system which conforms to IS-95A standard is allotted a 1.2288 MHz bandwidth to fully utilize the cellular band. The reverse link refers to transmission from the remote stations to a cell. On the reverse link, the 28.8 Kbps transmission rate is spread over the entire 1.2288 MHz system bandwidth.

On the reverse link, each transmitting remote station acts as an interference to other remote stations in the network. Therefore, the reverse link capacity is limited by the total interference which a remote station experiences from other remote stations. The IS-95A CDMA system increases the reverse link capacity by transmitting fewer bits, thereby using less power and reducing interference, when the user is not speaking.

To minimize interference and maximize the reverse link capacity, the transmit power of each remote station is controlled by two power control loops. The first power control loop adjusts the transmit power of the remote station such that the signal quality, as measured by the energy-per-bit-to-noise-plus-interference ratio, $E_b/(N_o+I_o)$, of the signal received at the cell is maintained at a constant level. This level is referred to as the $E_b/(N_o+I_o)$ set point. The second power control loop adjusts the set point such that the desired level of performance, as measured by the frame-error-rate (FER), is maintained. The power control mechanism for the reverse link is disclosed in detail in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention and incorporated by reference herein.

The user on each remote station transmits at a different bit rate depending on the level of speech activity in the conversation of that user. A variable rate speech vocoder provides speech data at full rate when the user is actively speaking and at low rate during period of silence, e.g. pauses. The variable rate vocoder is described in detail in U.S. Pat. No. 5,414,796, entitled "VARIABLE RATE VOCODER," assigned to the assignee of the present invention and incorporated by reference herein.

For the CDMA system, the reverse link capacity for voice communication between the remote stations and the cell, as measured by the number of users supportable by the cell, can be determined by the transmission rate of the user on each remote station. This is because other parameters determinative of the reverse link capacity are fixed by the system design or are given. For example, the maximum transmit power available for each remote station is limited by FCC regulations and also by system design constraints. The $E_b/(N_o+I_o)$ required to maintain the desired level of performance is dependent on the channel condition which cannot be controlled. Finally, the CDMA system bandwidth of 1.2288 MHz is selected by design.

The amount of speech activity at any given moment is non-deterministic. Also, there is typically no correlation in the level of speech activities among users. Therefore, the total power received at the cell from all transmitting remote stations varies over time and can be approximated as a Gaussian distribution. During periods of active speech, the remote station transmits at higher power and causes more interference to other remote stations. More interference lowers the received $E_b/(N_o+I_o)$ of other remote stations, which increases the probability of frame errors in the voice data received by the cell if the power control is not able to track the dynamics. Therefore, the number of users able to have access to the communication system is limited so that only a small portion of the transmitted frames is lost through excessive interference.

Limiting the reverse link capacity to maintain the desired frame error rate (FER) has the effect of forcing the cell to operate at less than full capacity, on the average, thereby under-utilizing the reverse link capacity. In the worse case, up to half of the reverse link capacity is wasted to maintain a headroom of up to 3 dB. The headroom is the difference between the maximum power the cell can receive and the average power the cell actually receives. The headroom is only utilized during the period when the speech activities of the users at the remote stations are high.

Data communication within the CDMA system has different characteristics than voice communication. For example, data communication is typically characterized by long period of inactivity, or low activity, punctuated by high bursts of data traffic. An important system requirement for data communication is the transmission delay required to transfer the burst of data. Transmission delay does not have the same impact in data communication as it does for voice communication, but it is an important metric for measuring of the quality of the data communication system.

A method for transmitting data traffic in code channel frames of fixed size, wherein the data source provides data at a variable rate, is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. Data is partitioned into data frames and each data frame may be further partitioned into data portions. The data portions are then encoded into code channel frames which can be 20 msec wide. At the 28.8 Kbps symbol rate, each 20 msec wide code channel frame contains 576 symbols. A rate ½ or rate ⅓ convolutional encoder is used to encode the data, depending on the application. Using a rate ⅓ encoder, the data rate is approximately 9.6 Kbps. At the 9.6 Kbps data rate, there are 172 data bits, 12 cyclic redundancy check (CRC) bits and 8 code tail bits per code channel frame.

High speed data transmission on the reverse link can be achieved by concurrently transmitting the data traffic over multiple code channels. The use of multiple code channels for data transmission is disclosed in U.S. patent application Ser. No. 08/656,649, entitled "METHOD AND APPARATUS FOR PROVIDING RATE SCHEDULED DATA IN A SPREAD SPECTRUM COMMUNICATION SYSTEM", filed May 31, 1996, and in U.S. patent application Ser. No. 081654,443, entitled "HIGH DATA RATE CDMA WIRELESS COMMUNICATION SYSTEM", filed May 28, 1996, both assigned to the assignee of the present invention and incorporated by reference herein.

The demand for the reverse link continuously changes over time, due to variations in the level of voice activities. The inefficient use of the reverse link can be improved by transmitting data traffic during the period of low voice activity. To avoid degradation in the quality of the voice communication, the data transmission should be dynamically adjusted to match the available reverse link capacity of the cell.

In dealing with large sporadic bursts of data traffic, a system should be designed with the capability to transmit at high data rates and the ability to allocate the reverse link capacity to the users whenever requested, based on the availability of the capacity. In a CDMA system, the design should address other existing system considerations. First, since voice communication cannot tolerate extensive delay, priority should be given to transmission of voice data over transmission of any data traffic. Second, since the amount of voice activity at any given moment is unpredictable, the reverse link should be continuously monitored and the data transmission should be dynamically adjusted so that the reverse link capacity is not exceeded. Third, since the remote station may be in soft handoff between multiple cells, the data transmission rate should be assigned based on the reverse link capacity of each of the base stations participating in the soft handoff. These and other considerations are addressed by the present invention.

SUMMARY OF THE INVENTION

The present invention is a novel and improved method and apparatus for high speed data transmission scheduling. The present invention improves utilization of the reverse link and decreases the transmission delay in data communication in a CDMA system by providing for a means of transmitting data traffic at a high speed transmission rate. During a communication with a cell, each remote station can transmit unscheduled transmissions at rates up to a maximum unscheduled transmission rate over the reverse link. In accordance with IS-95A, the maximum unscheduled transmission rate is 28.8 Kbps. The unscheduled transmissions can be used to send small amounts of data and control messages without the additional delay caused by scheduling. Additionally, each remote station can be assigned a maximum scheduled transmission rate which can be higher than the maximum unscheduled transmission rate. In the present invention, a channel scheduler determines the maximum scheduled transmission rate for high speed data transmission. The maximum scheduled transmission rate is assigned at each scheduling period according to the availability of the reverse link capacity.

It is an object of the present invention to improve utilization of the reverse link capacity in a CDMA system. When the remote station has a large amount of data to transmit to the cell, the channel scheduler collects information on how much data is to be transmitted, the available reverse link capacity for each cell in the network and other parameters to be discussed below. Based on the collected information and in accordance with a list of system goals and a list of system constraints, the channel scheduler assigns the maximum scheduled transmission rate. The maximum scheduled transmission rate is sent to the remote station. The remote station partitions the data into data frames and transmits the data frames over the reverse link at or below the maximum scheduled transmission rate.

It is another object of the present invention to minimize the transmission delay of data traffic over the reverse link. The maximum scheduled transmission rate is assigned by the channel scheduler based on the amount of data to be transmitted. Small amounts of data are transmitted immediately over the reverse link at or below the maximum unscheduled transmission rate. For larger amounts of data, the channel scheduler assigns a maximum scheduled transmission rate.

It is yet another object of the present invention to optimize utilization of the reverse link by allocating the available reverse link capacity to users based on a set of priorities. The users within the system are assigned a priority based on a set of factors. These factors include the energy-per-bit required by the user for the requisite level of performance, the list of cells supporting the user, the amount of data to be transmitted, the type of data to be transmitted, the type of data service being provided to the user, the amount of delay already experienced by the user, and other factors. The available capacity is allocated to the highest priority user first and the lowest priority user last.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
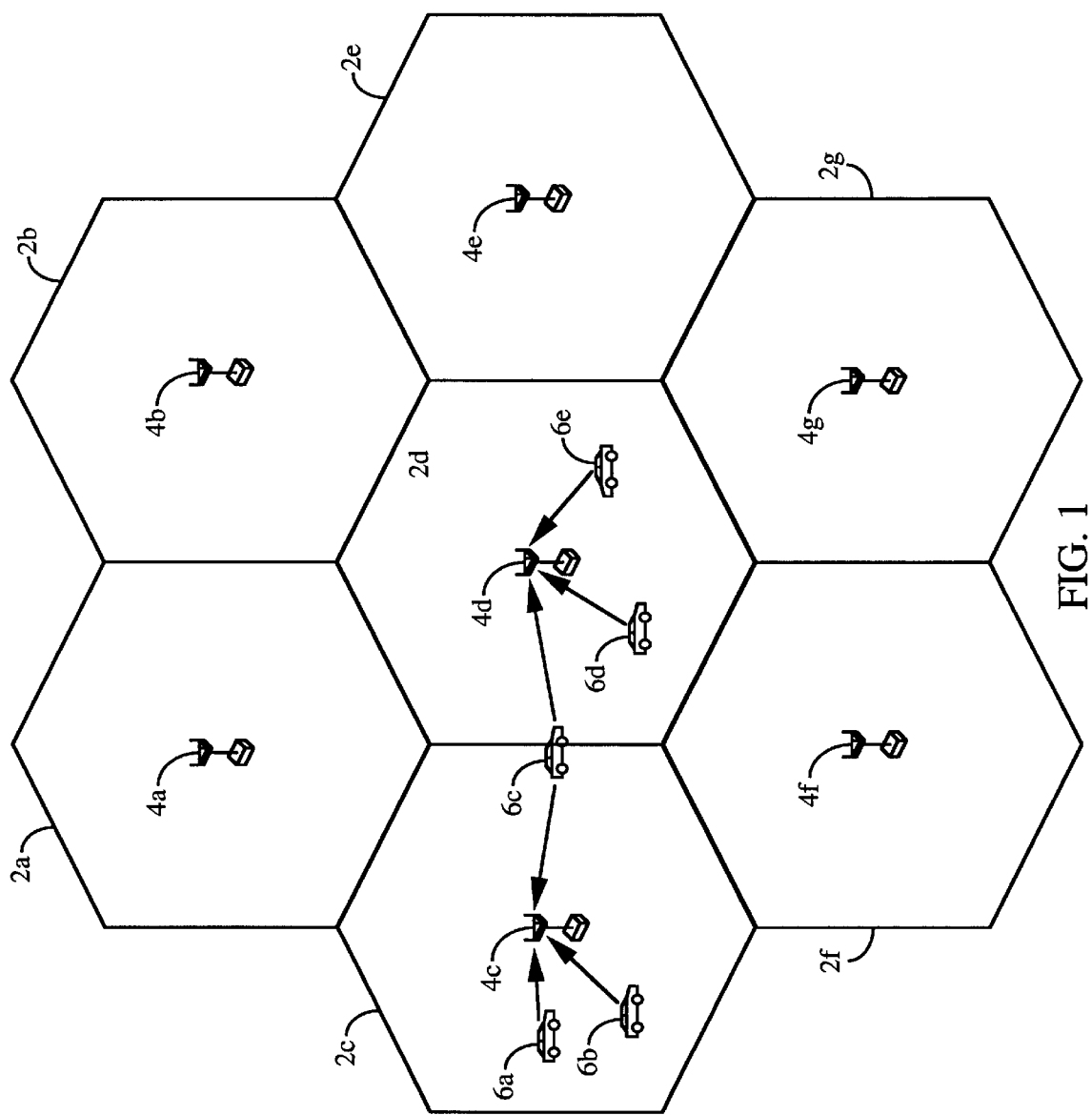
FIG. 1 is a diagram of a cellular network comprising a plurality of cells, a plurality of base stations and a plurality of remote stations.

Referring to the figures, FIG. 1 represents an exemplary cellular communication network composed of multiple cells 2a–2g. Each cell 2 is serviced by a corresponding base station 4. In the exemplary embodiment, the cellular network is a CDMA communication network, although the present invention is applicable to all wireless communication formats. Within the CDMA network, various remote stations 6 are dispersed 10 throughout. Each of remote stations 6 communicate with one or more base stations 4, depending on whether the remote station is in soft handoff. For example, remote stations 6a and 6b communicate exclusively with base station 4c, remote stations 6d and 6e communicate exclusively with base station 4d, but remote station 6c which is located near a cell boundary is in soft handoff and communicates simultaneously with base stations 4c and 4d. The use of soft handoff in a CDMA system is described in detail in the aforementioned U.S. Pat. No. 5,267,261.

Figure 2:
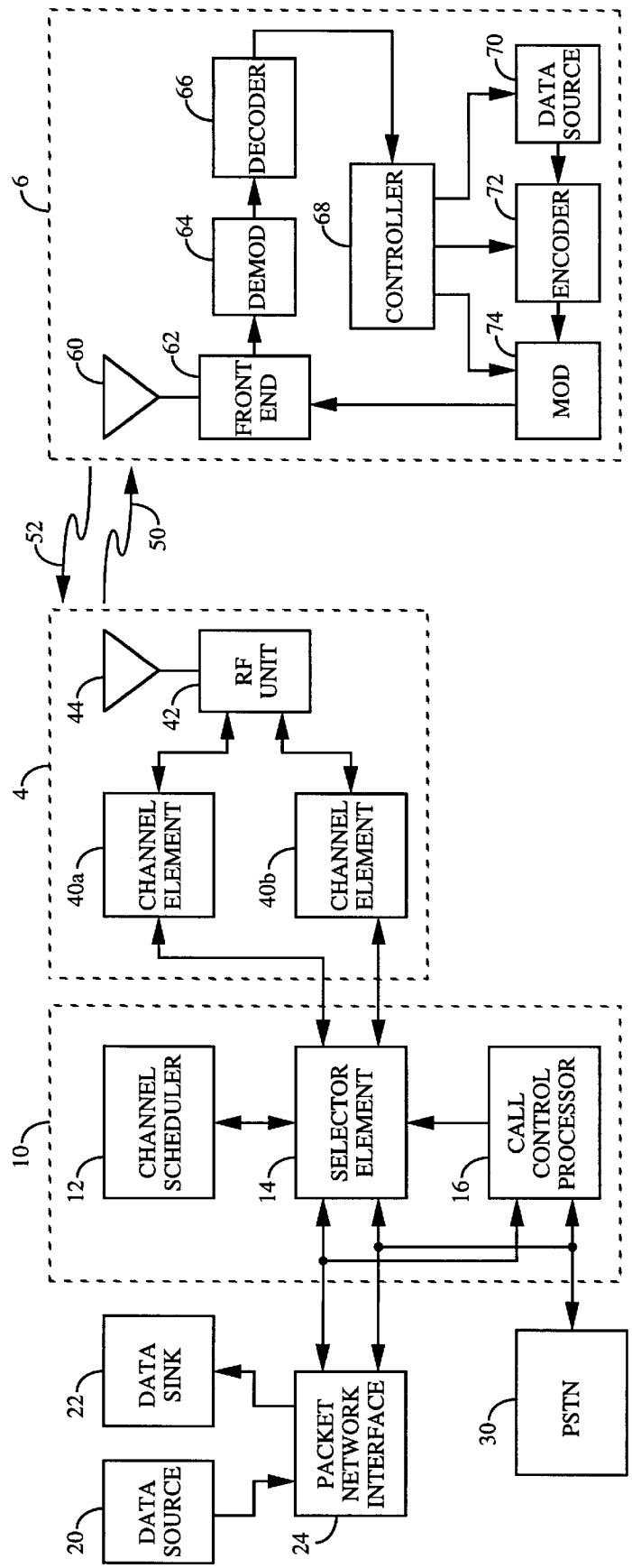
FIG. 2 is a block diagram illustrating the exemplary implementation of the present invention in a CDMA communication system.

A block diagram illustrating the basic architecture of the CDMA network of the present invention is shown in FIG. 2. Base station controller 10 interfaces with packet network interface 24, PSTN 30, and all base stations 4 in the CDMA network (only one base station 4 is shown in FIG. 2 for simplicity). Base station controller 10 coordinates the communication between remote stations 6 in the CDMA network and other users connected to packet network interface 24 and PSTN 30. Base station controller 10 contains many selector elements 14, although only one is shown in FIG. 2 for simplicity. One selector element 14 is assigned to control the communication between one or more base stations 4 and remote station 6.

On the reverse link, remote station 6 initiates a call by transmitting a request message to base station 4. Base station 4 receives the message and forwards the message to call control processor 16. Call control processor 16 sends a command to selector element 14 to direct base station 4 to assign a forward link traffic channel. Base station 4 uses one channel element 40 to control the call with remote station 6. After assigning the traffic channel, call control processor 40 is informed. Call control processor 40 then commands base station 4 to transmits a channel assignment message to remote station 6 on the forward link.

Remote station 6 initiates high speed data transmission on the reverse link by requesting permission from channel scheduler 12. Controller 68 within remote station 6 processes the request by routing the request command to encoder 72. Controller 68 can be implemented in a microcontroller, a microprocessor, a digital signal processing (DSP) chip, or an ASIC programmed to perform the function as described herein. In the exemplary embodiment, encoder 72 encodes the request command consistent with the Blank and Burst signaling data format described in the aforementioned U.S. Pat. No. 5,504,773. Encoder 72 generates and appends a set of cyclic redundancy check (CRC) bits, appends a set of code tail bits, convolutionally encodes the data and appended bits, and reorders the encoded data symbols. The interleaved bits are provided to modulator (MOD) 74. Modulator 74 maps the interleaved bits into another signal space using Walsh code mapping. Specifically, the interleaved bits are grouped into groups of six bits. The six bits are then mapped to a corresponding 64 chips Walsh sequence. Modulator 74 then spreads the Walsh code chips with a long pseudo noise (PN) code and short PN codes. The modulated signal is provided to front end 62. Front end 62 filters, amplifies, and transmits the signal over the air, through antenna 60, on reverse link 52.

Remote station 6 modulates the reverse link data in accordance with a long PN sequence. In the exemplary embodiment, each reverse link channel is defined in accordance with the temporal offset of a common long PN sequence generator. At two differing offsets the resulting modulation sequences are uncorrelated. The offset of remote station 6 is determined in accordance with a unique numerical identification of remote station 6, which in the exemplary embodiment of IS-95 remote stations 6 is the electronic serial number (ESN). Thus, each remote station 6 transmits on one uncorrelated reverse link channel determined in accordance with its unique electronic serial number.

At base station 4, the reverse link signal is received by antenna 44 and provided to RF unit 42. RF unit 42 filters, amplifies, downconverts, and quantizes the reverse link signal and provides the digitized baseband signal to channel element 40. Channel element 40 demodulates and decodes the baseband signal, the inverse of the signal processing functions done at remote station 6. Channel element 40 despreads the digitized baseband signal with the short PN codes and the long PN code. Channel element 40 then signal maps the despread data. Specifically, the despread data is grouped into blocks of 64 chips and assigned a Walsh code having a Walsh sequence closest to the block of despread data. The Walsh code comprises the demodulated data. Channel element 40 then reorders the demodulated data, convolutionally decodes the de-interleaved data, and performs the CRC check function. The decoded data, e.g. the request command, is provided to selector element 14. Selector element 14 routes the request command to channel scheduler 12.

Channel scheduler 12 connects to all selector elements 14 within base station controller 10. Channel scheduler 12 assigns the maximum scheduled transmission rate that can be used by each remote station 6 for high speed data transmission on the reverse link. The maximum scheduled transmission rates for remote stations 6 are provided to selector element 14. Selector element 14 routes the scheduling information to channel element 40 which encodes and modulates the scheduling information. The modulated signal is provided to RF unit 42 which up converts and conditions the signal. The signal is transmitted by antenna 44 over forward link 50.

At remote station 6, the forward link signal is received by antenna 60 and routed to front end 62. Front end 62 filters, amplifies, downconverts, and quantizes the received signal and provides the digitized baseband signal to demodulator (DEMOD) 64. The digitized baseband signal is demodulated by demodulator 64 and decoded by decoder 66, the inverse of the signal processing performed by channel element 40. The decoded data, which contains the maximum scheduled transmission rate, is routed to controller 68. Controller 68 receives the scheduling information and configures the hardware to begin data transmission at or below the maximum scheduled transmission rate.

High speed data transmission occurs in essentially the same manner as that described above for transmission of the request command, with the exception that data transmission can occur at rates up to the maximum scheduled transmission rate. At remote station 6, the data is partitioned into data frames. In this specification, a data frame refers to the amount of data which is transmitted from remote station 6 to base station 4 within one frame time period. The data frame can be further partitioned into smaller units called data portions. The data frames are sent from data source 70 to encoder 72. Encoder 72 formats the data frames, inserts the set of generated CRC bits and a set of code tail bits, convolutionally encodes the data, and reorders the encoded data. A method for encoding and interleaving the data is described in detail in the aforementioned U.S. Pat. No. 5,504,773. The encoded data frames are provided to modulator 74 which performs signal mapping using Walsh code. Modulator 74 then spreads the mapped data with a long pseudo noise code and short PN codes and provides the spread data to front end 62. Front end 62 filters, amplifies, up converts and transmits the signal over the air through antenna 44 on reverse link 52.

Base station 4 receives the reverse link signal and demodulates and decodes the reverse link signal in the manner described above. The decoded data is provided by channel element 40 to selector element 14. Selector element 14 provides the data to packet network interface 24 which routes the data to data sink 22. The hardware, as described above, supports transmission of both data and voice communication over the CDMA network.

The functions described above can also be accomplished by other implementations. The location of channel scheduler 12 and selector element 14 is dependent on whether a centralized or distributed scheduling processing is desired. For example, channel scheduler 12 and selector element 14 can be included within base stations 4. This distributed processing allows each base station 4 to perform its own scheduling, thereby possibly minimizing the processing delay. Conversely, channel scheduler 12 can be designed to control communication with all base stations 4 in the network. This centralized processing may result in the optimal utilization of system resources. These examples illustrate that channel scheduler 12 does not have to be incorporated in base station controller 10 as shown in the exemplary embodiment. Other implementations of the above described functions can be contemplated and are within the scope of the present invention.

The reverse link transmissions can be classified into two classes. The first class contains unscheduled tasks which, in the preferred embodiment, are not scheduled because of intolerance to additional processing delay. This class includes voice communications and certain types of data communication (e.g. acknowledgment messages for higher layers). The second class encompasses scheduled tasks which can tolerate additional processing and queuing delay. This class includes most data communications between remote stations 6 and base stations 4.

As shown in FIG. 1, remote stations 6 are dispersed throughout the CDMA network and can be in communication with one or more base stations 4 simultaneously. Therefore, channel scheduler 12 coordinates transmissions of the scheduled and unscheduled tasks over the entire CDMA network. In the present invention, the transmission of the scheduled tasks on the reverse link are scheduled by channel scheduler 12, based on the availability of the reverse link capacity, in order to avoid degradation in the transmission of the scheduled and unscheduled tasks. Channel scheduler 12 is tasked with the function of assigning the data transmission rate to each scheduled user on remote station 6 within the CDMA network such that a set of goals is optimized. These goals include (1) improved utilization of the reverse link capacity by transmitting as much scheduled and unscheduled tasks as can be supported within system capacity constraints, (2) improved quality in the communication and minimized transmission delay, (3) fair allocation of the reverse link capacity to all scheduled users based on a set of priorities, and (4) minimized transmit power of remote station 6 to extend battery life and reduce interference. The goals are optimized by balancing a list of factors which are discussed in detail below.

Figure 3:
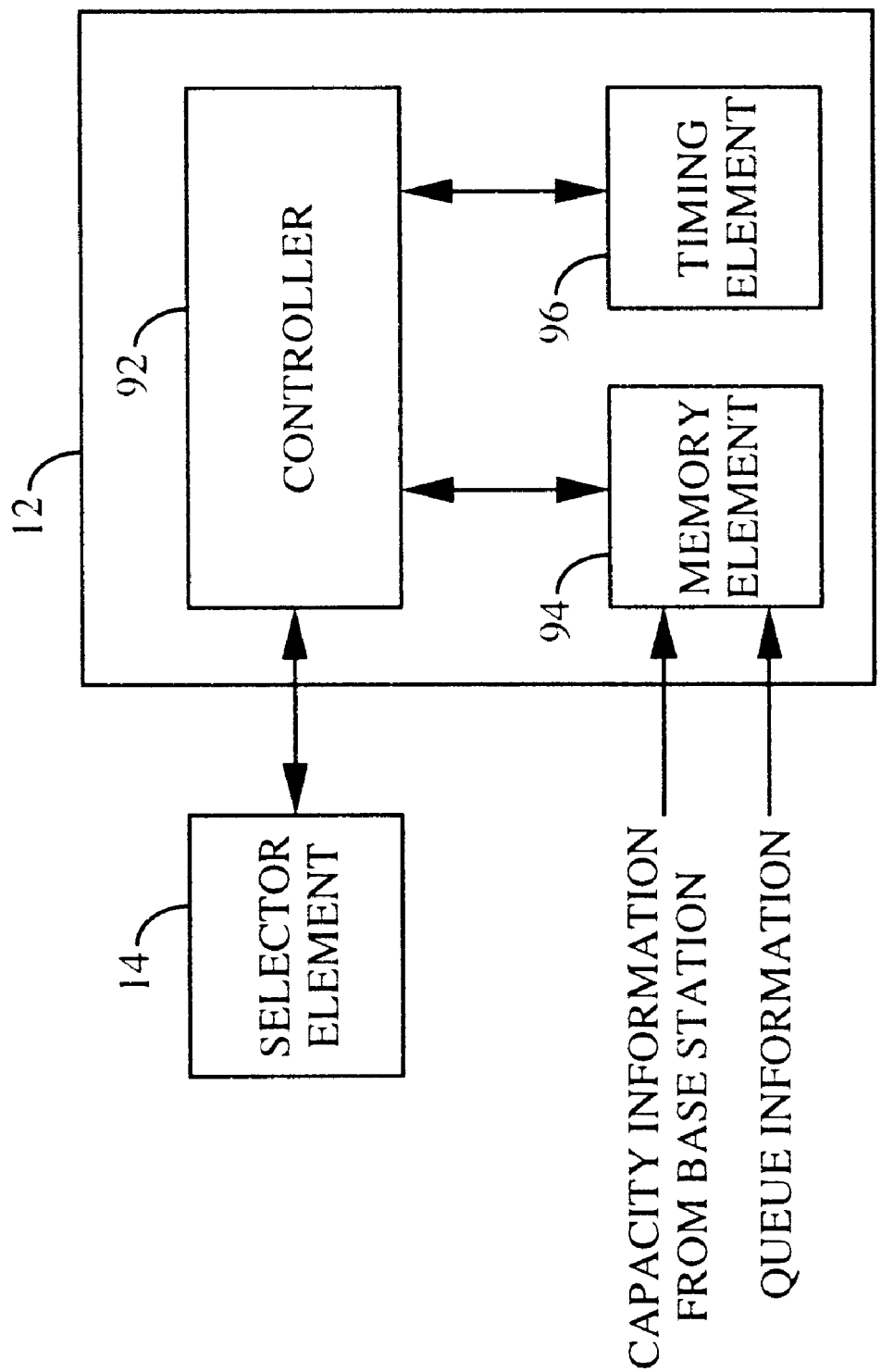
FIG. 3 is a block diagram of the channel controller.

A block diagram of channel scheduler 12 of the present invention is shown in FIG. 3. Controller 92 collects the pertinent information from all base stations 4 in the CDMA network and assigns the data transmission rates. Controller 92 can be implemented in a microcontroller, a microprocessor, a digital signal processing (DSP) chip, or an ASIC programmed to perform the function as described herein. Controller 92 connects to all selector elements 14 within base station controller 10. Controller 92 collects information regarding the demand and capacity for the reverse link. The collected information is stored in memory element 94 and retrieved by controller 92 as needed. Memory element 94 can be implemented using a storage element or one of any number of memory devices, such as RAM memory devices, latches, or other types of memory devices, that are known in the art. Controller 92 also connects to timing element 96. Timing element 96 can be implemented with a counter run by a system clock, an on board oscillator locked to an external signal, or a storage element for receiving system timing from an external source. Timing element 96 provides controller 92 with the timing signals necessary to perform the reverse link rate scheduling. The timing signals also allow controller 92 to send the maximum scheduled transmission rates to selector element 14 at the appropriate interval.

I. Reverse Link Rate Scheduling

Figure 7:
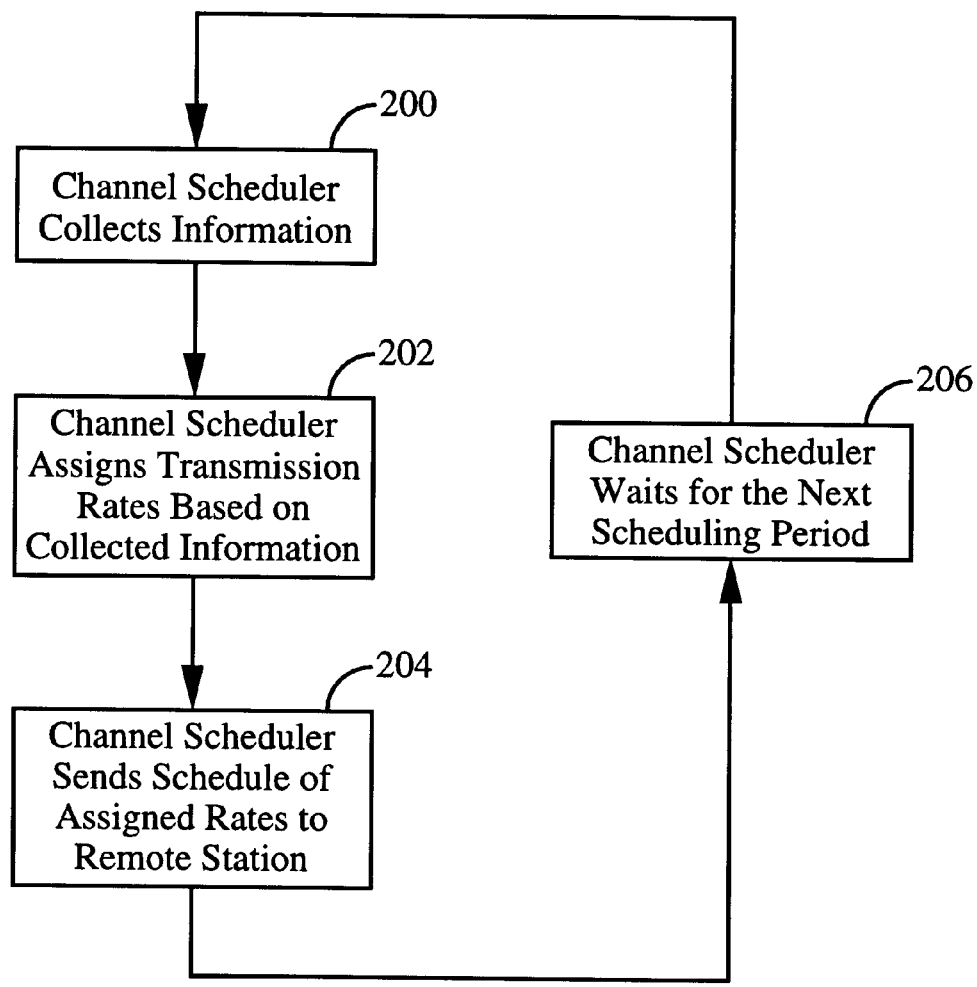
FIG. 7 is a flow diagram of the reverse link rate scheduling of the present invention.

The flow diagram of the reverse link rate scheduling methodology of the present invention is shown in FIG. 7. The first step in the scheduling process, step 200, involves the collection of all pertinent information necessary for the optimal assignment of the data transmission rates for each scheduled user at remote station 6. The pertinent information may include the number of scheduled and unscheduled tasks, the transmit power available to each remote station 6, the queue size indicating the amount of data to be transmitted by each remote station 6, the $E_b/(N_o+I_o)$ set point and the measured $E_b/(N_o+I_o)$ for each remote station 6 at base station 4, the transmission rate for the unscheduled task for each remote station 6 during the prior scheduling periods, the active member set of each remote station 6 listing the cells with which remote station 6 is in communication, the priority of remote stations 6, and the total power received at each cell for the prior scheduling period. Each of these parameters is discussed in detail below. Having collected the information from each cell, channel scheduler 12 assigns a maximum scheduled transmission rate for each scheduled user based on the collected information, the set of aforementioned goals, and the list of system constraints described below at step 202. Channel scheduler 12 sends the scheduling information which contains the maximum scheduled transmission rate to each remote station at step 204. The data is transmitted by remote station 6 at or below the maximum scheduled transmission rate which has been assigned to remote station 6 a predetermined number of frames later. Channel scheduler 12 then waits, at step 206, until the next scheduling period to restart the scheduling cycle.

The assignment of the maximum scheduled transmission rate can be accomplished by at least two embodiments. In the first embodiment, channel scheduler 12 assigns the maximum scheduled transmission rate to each scheduled user. And in the second embodiment, the scheduled user requests a maximum scheduled transmission rate.

Figure 8:
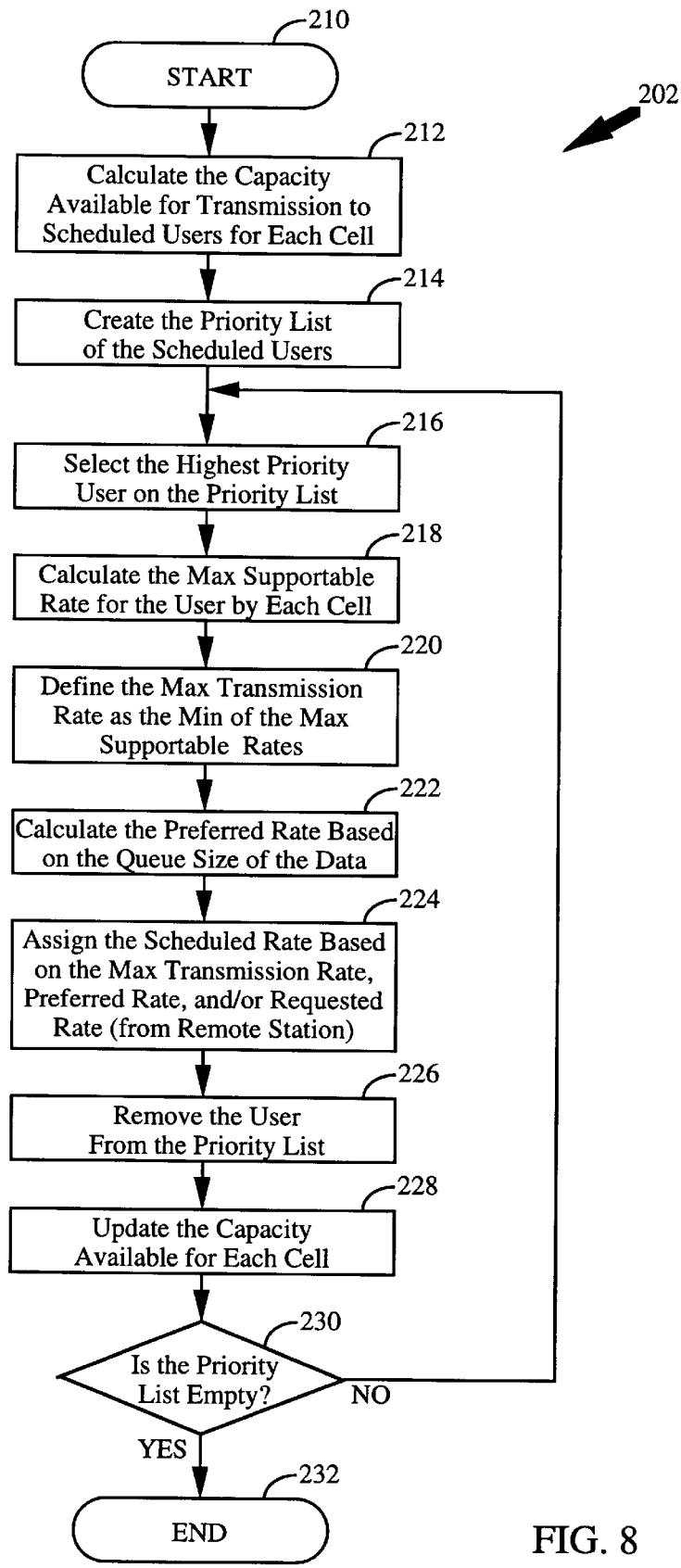
FIG. 8 is a flow diagram of the data transmission rate assignment of the present invention.

In the first embodiments, the assignment of the maximum scheduled transmission rate for the scheduled users, at step 202 of the flow diagram in FIG. 7, is further illustrated by the flow diagram shown in FIG. 8. Channel scheduler 12 assigns the maximum scheduled transmission rate for the scheduled task of each remote station 6 such that the aforementioned goals are achieved. In assigning transmission rates, channel scheduler 12 conforms to the following system constraints: (1) remote station 6 transmit power—the power required to transmit at the maximum scheduled transmission rate must be available to remote station 6; (2) cell received power—the total power received by each cell must not exceed a predetermined threshold so that the interference to remote stations 6 is not excessive; (3) soft handoff—the maximum scheduled transmission rate is the same for all cells supporting remote station 6 in soft handoff. (4) remote station 6 queue size—a high transmission rate is only assigned to remote station 6 which has sufficient amount of data to transmit. Each of these constraints are discussed in detail below.

In the exemplary embodiment, the transmit power available for each remote station 6 is sent to channel scheduler 12 some amount of time prior to the start of each scheduling period, along with the queue size, and can be considered in the assignment of the maximum scheduled transmission rate. If this information is not available to channel scheduler 12, the rate assignment is performed without consideration of the transmit power of remote station 6.

Channel scheduler 12 enters the flow diagram of FIG. 8 after having collected the pertinent information necessary for the optimal assignment of data transmission rates to the scheduled users. Channel scheduler 12 starts at state 210. In the first step, channel scheduler 12 calculates the total capacity available for each cell in the CDMA network at step 212. The total capacity available for scheduled transmission for each cell is calculated as:

$$Q_{avail} = 1 - \frac{P_r}{P_{max}}, \qquad (1)$$

where $Q_{avail}$ is the reverse link capacity available for scheduled transmission, $P_r$ is the received power at the cell that is not from the same cell scheduled tasks, and $P_{max}$ is maximum allowable total received power at the cell. The power received at the cell that is not from the same cell scheduled tasks includes the background thermal noise power $N_oW$, the power $P_{adj}$ from remote stations 6 in the adjacent cells, and the power $P_{unscheduled}$ from remote station 6 within the same cell for unscheduled tasks.

The equation which channel scheduler 12 needs to satisfy when assigning a data transmission rate is:

$$\sum \hat{\gamma}_i \frac{R_i}{W} \leq 1 - \frac{\hat{P}_r}{P_{max}}, \qquad (2)$$

where $\hat{\gamma}_i$ is the predicted $E_b/(N_o+I_o)$ set point of the i-th remote station for the upcoming scheduling period, $R_i$ is the data transmission rate assigned to the i-th remote station, W is the system spreading bandwidth, and $\hat{P}_r$ is the predicted received power at the cell that is not from the same cell scheduled tasks for the upcoming scheduling period. For an IS-95A system, W is 1.2288 MHz.

The derivation of equation (2) and the meaning of each of the terms in equation (2) are described in detail below. Each of the terms in the quantity on the right hand side of equation (2) can be calculated or is known. The quantity on the right hand side of equation (2) is calculated once for each cell in the network, at the start of each scheduling period.

The capacity $Q_{avail}$ available for scheduled transmission can be defined or calculated by other methods than that shown in equation (1). Furthermore, $Q_{avail}$ can be influenced by controlling the transmissions of the unscheduled tasks. For example, channel scheduler 12 can increase $Q_{avail}$ by limiting the transmission rates of one or more remote stations 6 to decrease $P_r$. Other methods to define and manipulate $Q_{avail}$ can be contemplated and are within the scope of the present invention.

Note that the terms used in all equations throughout this specification are given in linear scale (not in dB), unless otherwise specified. Note also that symbols without extra markings (e.g. $E_{bi}$) represent the actual value for the upcoming scheduling period, symbols marked with an underscore (e.g. $\underline{E}_{bi}$) represent the known or measured value for the prior scheduling period, and symbols marked with a hat (e.g. $\hat{E}_{bi}$) represent the predicted value for the upcoming period.

On the left hand side of equation (2), the predicted set point $\hat{\gamma}_i$ of the scheduled user for the upcoming scheduling period is assumed to be the same as the set point $\underline{\gamma}_i$ for the prior scheduling period. Therefore, having a prediction of the capacity available for the cells and the set point of a particular remote station 6, channel scheduler 12 is able to determine the maximum transmission rate which can be supported by the cells for this particular remote station 6.

Channel scheduler 12 then creates a priority list of all scheduled users at step 214. The priority list is a function of numerous factors, each of which is discussed in detail below. The scheduled users are arranged according to their relative priority, with the scheduled user having the highest priority placed at the top of the list and the scheduled user having the lowest priority placed at the bottom of the list. Channel scheduler 12 then enters a loop and assigns the available reverse link capacity to the scheduled users in accordance with the priority list.

In the first step within the transmission rate assignment loop, channel scheduler 12 selects the scheduled user on the priority list having the highest priority at step 216. Channel scheduler 12 then identifies the cells supporting this scheduled user. These cells are listed in the active member set of the scheduled user. If the scheduled user is in soft handoff, each of the cells supporting the user simultaneously receives the data transmitted by the user. Thus, for each cell in the active member set, channel scheduler 12 calculates the maximum supportable transmission rate for the scheduled user at step 218. The maximum supportable transmission rate for each cell can be calculated by multiplying the quantity on the right hand side of equation (2) with $W/\underline{\gamma}_i$.

Remote station 6 can also transmit a requested transmission rate to the cell. The requested transmission rate can be based on the queue size which is indicative of the amount of data to be transmitted, the total transmit power available to remote station 6, the predicted transmit energy-per-bit required for the upcoming scheduling period, and the back-off power of remote station 6. The requested transmission rate represents the maximum transmission rate which remote station 6 can support. This value is derived in detail below.

Channel scheduler 12 can also recommend a preferred transmission rate based on the amount of data, as measured by the queue size, to be transmitted by the scheduled user at step 222. The preferred transmission rate can also be made a function of the transmit power available to remote station 6, if this information is available to channel scheduler 12. In the exemplary embodiment, the queue size and the transmit power available to remote station 6 are sent from remote station 6 to channel scheduler 12 at the start of each scheduling period. The preferred transmission rate is selected to be at or below the transmission rate required to transmit the data in the queue within the scheduling interval.

To ensure that the reverse link capacity allocated to the scheduled task for this remote station 6 can be supported by each cell supporting remote station 6 in soft handoff, channel scheduler 12 selects the minimum transmission rate from the list of maximum supportable transmission rates, the requested transmission rate, and the preferred transmission rate at step 220. The selected minimum transmission rate is defined as the maximum scheduled transmission rate for this scheduled user. Having assigned a transmission rate to this scheduled user, channel scheduler 12 removes the scheduled user from the priority list at step 226. The capacity available for each cell is then updated, at step 228, to reflect the capacity $Q_i$ allocated to the scheduled user just removed from the priority list. The capacity is updated by subtracting the capacity just allocated, computed as $Q_i = \underline{\gamma}_i \cdot R_i/W$, from the quantity on the right hand side of equation (2) for each cell in the active member set. The updated capacity is used in the subsequent transmission rate assignment. Channel scheduler 12 then determines whether all scheduled users on the priority list have been assigned a transmission rate at step 230. If the priority list is not empty, channel scheduler 12 returns to step 216 and assigns a data transmission rate to the scheduled user with the next highest priority. The assignment loop is repeated until the priority list contains no scheduled user. If the priority list is empty, the assignment process terminates at state 232.

In the alternative embodiment, the allocation of the reverse link capacity can also be accomplished by an allocation of capacity to the scheduled users instead of an assignment of a maximum scheduled transmission rate. In this embodiment, channel scheduler 12 allocates a reverse link capacity to the scheduled users. The allocated capacity, $Q_i$, is routed to selector element 14 which computes the maximum scheduled transmission rate based on the allocated capacity and the set point of the scheduled user (e.g. $R_i = Q_i \cdot W/\underline{\gamma}_i$). In this embodiment, selector element 14 can assign new maximum scheduled transmission rates for the scheduled users at each frame in the scheduling period based on the changes in the set point of the scheduled users. This allows selector element 14 to maintain a quality communication for the scheduled and unscheduled tasks on the reverse link by maintaining the interference at an acceptable level. Other embodiments to allocate the reverse link capacity can be contemplated and are within the scope of the present invention.

The capacity available for each cell can also be allocated to the scheduled users without the use of a loop. For example, the available reverse link capacity can be allocated according to a weighting function. The weighting function can be based on the priority of the scheduled users and/or some other factors.

The priority list determines the allocation of the reverse link capacity to the scheduled users. A scheduled user having a higher priority is allocated more capacity than one having a lower priority. Although it is preferable to allocate the capacity in an order based on the priority of the scheduled user, this is not a necessary limitation. The available resource can be allocated in any order, and all are within the scope of the present invention.

The reverse link rate scheduling of the present invention can be performed continuously, periodically, or in a staggered manner. If the scheduling is performed continuously or periodically, the scheduling interval is selected such that the reverse link capacity of the cells is fully utilized for the duration of the scheduling period. This objective can be accomplished by the following embodiments. Other embodiments which are variations or combinations of the following embodiments can be contemplated and are within the scope of the present invention.

In the first embodiment, the scheduling (or capacity allocation) is performed every frame. This embodiment allows channel scheduler 12 to dynamically adjust the maximum scheduled transmission rate of the scheduled user at each frame to fully utilize the capacity available for each cell in the network. More processing is required to assign the maximum scheduled transmission rate at each frame. Also, more overhead is required to transmit the necessary scheduling information to each scheduled user at each frame. In addition, remote stations 6 may be required to provide information to channel scheduler 12 concerning its current transmit power, it maximum transmit power, and its capabilities more frequently.

In the second embodiment, the scheduling is performed every K frames, where K is an integer greater than one. For each scheduling interval, channel scheduler 12 assigns the maximum scheduled transmission rate for each scheduled user. In the exemplary embodiment, the maximum scheduled transmission rate can be calculated by using a high value for $P_{max}$ in equation (2). Furthermore, the maximum scheduled transmission rate can be calculated by using a lower value for the set point than the set point $\gamma_t$ for the prior scheduling period. The users who are scheduled are notified. In the exemplary embodiment, the schedule of the maximum scheduled transmission rates is transmitted to the scheduled users once per scheduling period. Data transmissions at the high speed transmission rates occur a predetermined number of frames later, as discussed below. The maximum scheduled transmission rate for the scheduled tasks is allocated by channel scheduler 12 for the duration of the scheduling period. During a scheduling period, if the capacity of the cells does not support data transmission at the maximum scheduled transmission rates, channel scheduler 12 can direct data transmission at lower transmission rates.

During a scheduling period, each remote station 6 has permission to transmit at a rate up to its maximum scheduled transmission rate. If remote station 6 is not able to transmit at the maximum scheduled transmission rate, remote station 6 may notify the cell of data transmission at a lower transmission rate. Remote station 6 then concurrently, or soon thereafter, transmits data at the lower transmission rate. Likewise, if the reverse link capacity for the cells does not support data transmission at the maximum scheduled transmission rates, channel scheduler 12 directs data transmission at a lower transmission rate.

The second embodiment is preferable to the first embodiment for several reasons. On the reverse link, a scheduling delay exists from the time the data is made available to remote station 6 to the time of data transmission at the high speed transmission rate. In the exemplary embodiment, the scheduling delay can be up to seven frames in length. The scheduling delay impacts the responsiveness of channel scheduler 12 to changes in the reverse link capacity and demand. When the reverse link is lightly loaded, allowing remote station 6 to transmit at any rate, up to the maximum scheduled transmission rate, reduces the scheduling delay. When remote station 6 has no more data to transmit, remote station 6 can immediately reduce the transmission rate and, thus, reduce the reverse link interference to other remote stations 6. Additionally, the signal processing and the transmit power resources are not as limited at the cell as in remote station 6. Thus, the cell can demodulate at the maximum scheduled transmission rates without a major performance penalty.

The second embodiment also has the advantage of requiring less overhead to transmit the schedule of the maximum scheduled transmission rates to the scheduled users. In the first embodiment, the scheduling information is transmitted at each frame to the scheduled users. A portion of the forward link resource is thus allocated to this overhead. In the second embodiment, the scheduling information is transmitted once per scheduling period to the scheduled users. For example, if the scheduling interval is ten frames, the second embodiment requires slightly more than $\frac{1}{10}$ of the overhead of the first embodiment while still maintaining efficient utilization of the reverse link. The transmission rate reassignment, to be discussed below, can be performed at each frame in the scheduling period to allow channel scheduler 12 to dynamically reassign the transmission rates at each frame. The additional overhead necessary to transmit the schedule of the temporary transmission rates is minimal, since the transmission rate of only a fraction of the scheduled users are reassigned at each frame. In fact, just enough scheduled users are reassigned so that all cells in the network operate at less than the total reverse link capacity available for the cells.

Alternately, in the third embodiment, the reverse link rate scheduling of the present invention can be staggered. In this embodiment, the scheduling can be triggered by certain events. For example, channel scheduler 12 can perform the reverse link rate scheduling whenever a request for high speed data transmission is received or whenever a scheduled high speed data transmission by remote station 6 is completed. Channel scheduler 12 has knowledge of the amount of data to be transmitted by each remote station 6 and the maximum scheduled transmission rate. Typically, remote station 6 transmits at the maximum scheduled transmission rate except in extenuating circumstances, e.g. lack of available transmit power. Thus, channel scheduler 12 is able to determine when the high speed data transmission is completed. Upon termination of a scheduled transmission by remote station 6, channel scheduler 12 can perform the scheduling and allocate the reverse link capacity to other remote stations 6. The schedule of the maximum scheduled transmissions rate is only transmitted to remote stations 6 which has been assigned or reassigned a transmission rate.

The reverse link rate scheduling of the present invention can be performed by channel scheduler 12 for all cells in the CDMA network. This embodiment enables channel scheduler 12 to effectively schedule high speed data transmission for remote stations 6 which are in soft handoff and are in communication with multiple cells. Scheduling for the entire network is more complex because of the various interactions between the cells and remote stations 6. In the alternative embodiment, to simplify the scheduling, the scheduled tasks can be divided into two categories, specifically, scheduled tasks from remote stations 6 which are in soft handoff and scheduled tasks from remote stations 6 which are not in soft handoff. In this embodiment, the reverse link rate scheduling for remote stations 6 which are communication with only one cell can be performed at the cell level. Remote stations 6 which are in communication with multiple cells can be scheduled by channel scheduler 12. The present invention is applicable to all embodiments of the forward link rate scheduling, including centralized scheduling, distributed scheduling, and any combinations thereof.

II. Transmission Rate Reassignment

In the first embodiment described above, wherein the reverse link rate scheduling is performed every frame, the reverse link capacity can be reallocated during the scheduling period to match the reverse link demand with the available capacity. Although the capacity is allocated every frame, the scheduling delay may have resulted in suboptimal capacity allocation. During the scheduling delay, the status of the system may have changed. Also, the initial predictions may not have been accurate and may require modification.

In the second embodiment, wherein the scheduling is performed every K frames, the transmission rate can be reassigned during the scheduling period to match the reverse link demand with the available reverse link capacity. In the exemplary embodiment, data transmission occurs at or below the maximum scheduled transmission rate for the duration of the scheduling period, without the use of the transmission rate reassignment routine. This simplifies the scheduling routine but can result in a lower $E_b/(N_o+I_o)$ which can degrade the quality of the communication. In the preferred embodiment, the maximum scheduled transmission rates can be reassigned at each frame to maintain a quality communication.

During the scheduling period, if the reverse link capacity for the cells does not support data transmissions at the maximum scheduled transmission rates, channel scheduler 12 directs data transmissions at lower transmission rates. For each frame in which the reverse link capacity for the cells is inadequate to service the demand by the scheduled and unscheduled tasks, channel scheduler 12 determines the amount of increase in the reverse link demand and the available reverse link capacity. Channel scheduler 12 then assigns lower transmission rates for some or all scheduled users such that the capacity required by the users does not exceed the total capacity available for the cells. In the exemplary embodiment, the lower transmission rates are referred to as the temporary transmission rates and are used for only one frame. For subsequent frames in the scheduling period, the maximum scheduled transmission rates are used unless they are modified, again, by channel scheduler 12.

Channel scheduler 12 can also attempt to minimize the transmission rate reassignment by increasing the total capacity available for the cells. Increasing the total capacity can be achieved by lowering the transmission rates of the unscheduled users (e.g. limiting the transmission rates of the voice users to lower rates).

In the exemplary embodiment, the transmission rate reassignment is performed every frame to ensure that the capacity required for the scheduled and unscheduled tasks for each cell is less than the total reverse link capacity available for the cells. The schedule of the temporary transmission rates is transmitted to the scheduled users who have been reassigned with temporary transmission rates. For each frame, the scheduled user verifies that the transmission rate has not been reassigned. At each frame within the scheduling period, each scheduled user transmits data at or below the maximum scheduled transmission rate or the temporary transmission rate.

Figure 9:
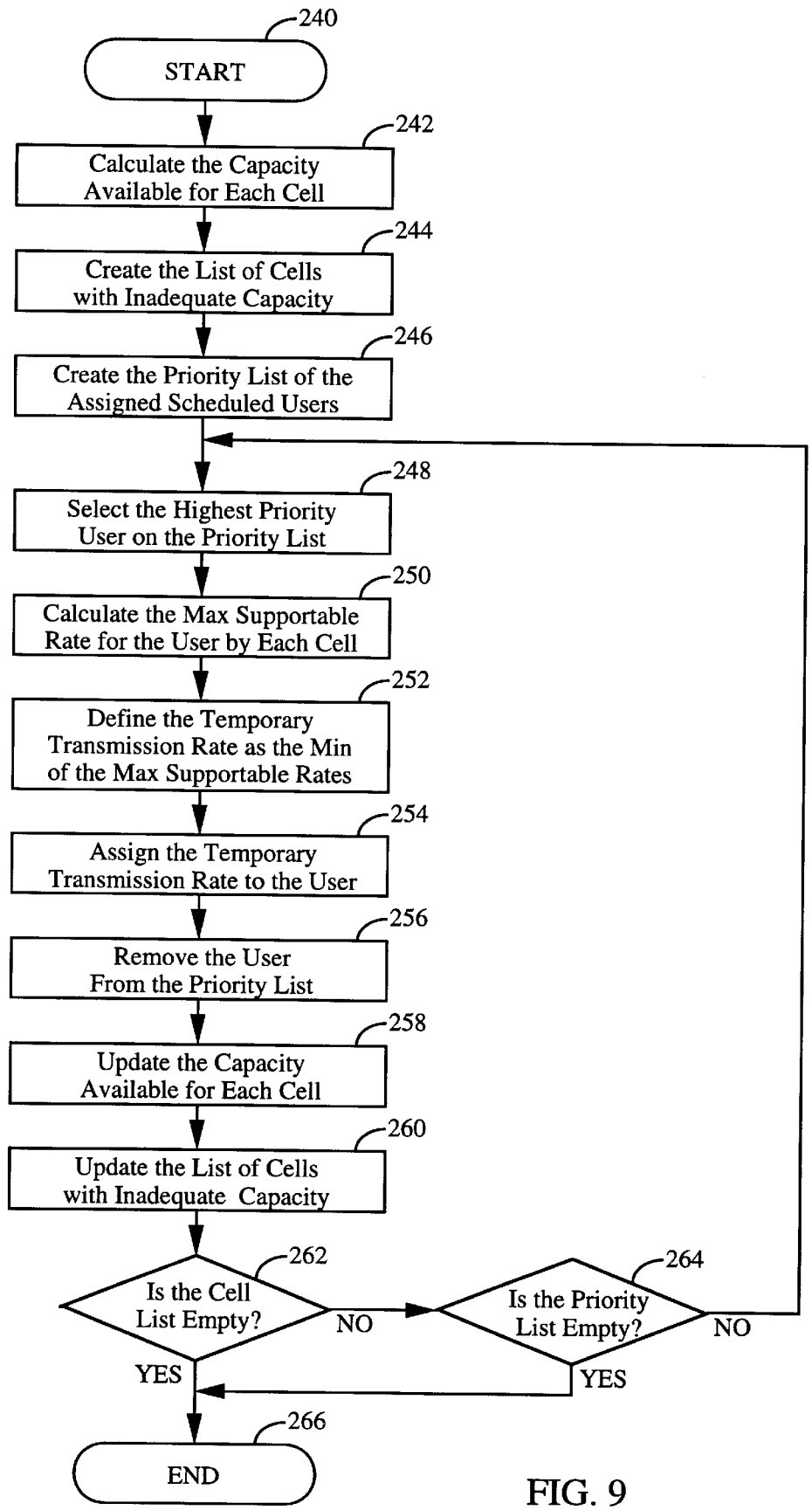
FIG. 9 is a flow diagram of the data transmission rate re-assignment of the present invention.

The transmission rate reassignment is illustrated by the flow diagram shown in FIG. 9. Channel scheduler 12 starts at state 240. In the first step, at step 242, channel scheduler 12 creates a cell list of cells in the network for which the reverse link capacity required for the scheduled and unscheduled tasks exceeds the total capacity available for the cell. Channel scheduler 12 calculates the total reverse link capacity available for each cell in the CDMA network using equation (2) at step 244. Next, channel scheduler 12 creates the priority list of all scheduled users which are in communication with at least one cell in the cell list and which have been assigned a transmission rate for the current scheduling period at step 246. The scheduled users in the priority list are referred to as the affected scheduled users. Channel scheduler 12 then enters a loop and reassigns the transmission rate of some or all affected scheduled users in accordance with the priority list and the cell list.

In the first step within the transmission rate reassignment loop, channel scheduler 12 selects the affected scheduled user having the highest priority at step 248. Channel scheduler 12 then identifies the cells supporting the affected scheduled user for high speed data transmission. These cells are referred to as the selected cells. Next, channel scheduler 12 calculates the maximum supportable transmission rate for the affected scheduled user by each selected cell at step 250. To ensure that the reverse link capacity allocated to this scheduled user can be provided by each selected cell, channel scheduler 12 selects the minimum transmission rate from the list of maximum supportable transmission rates and the maximum scheduled transmission rate at step 252. The selected minimum transmission rate is defined as the temporary transmission rate. In the exemplary embodiment, the temporary transmission rate is lower than the maximum scheduled transmission rate and is only assigned to the scheduled user for the upcoming frame at step 254. The affected scheduled user is removed from the priority list at step 256. The total reverse link capacity available for each selected cell is then updated, at step 258, to reflect the capacity allocated to the affected scheduled user just removed from the priority list. Channel scheduler 12 then updates the cell list and removes the cells for which the total reverse link capacity is zero at step 260. Next, channel scheduler 12 determines whether the cell list is empty at step 262. If the cell list is not empty, channel scheduler 12 determines if the priority list is empty at step 264. If the priority list is not empty, channel scheduler 12 returns to step 248 and reassigns a data transmission rate to the affected scheduled user with the next highest priority. The transmission rate reassignment loop continues until the cell list or the priority list is empty. If the cell list or the priority list is empty, the transmission rate reassignment process terminates at state 266.

Channel scheduler 12, selector element 14, or the cell can also temporarily assign lower transmission rates to remote stations 6 if the FER at the cell is high or if the measured total received power $P_{total}$ is above a predetermined threshold. The temporary transmission rates can be sent to remote stations 6 immediately, without having to wait for the next scheduling period, and data transmissions at the temporary transmission rates can occur immediately or soon thereafter. This reduces the processing delay and allows channel scheduler 12 or the cell to take quick action to improve the quality of the communication on the reverse link.

The maximum scheduled transmission rate represents a permission given by channel scheduler 12 to remote station 6 to transmit up to the maximum scheduled transmission rate. Remote station 6 can transmit at lower transmission rates. If remote station 6 determines that its available transmit power does not support data transmission at the maximum scheduled transmission rate, remote station 6 can send a rate reduction message to all cells in communication with remote station 6. The rate reduction message indicates the lower transmission rate which remote station 6 intends to use. In the exemplary embodiment, remote station 6 transmits at the lower transmission rate at the same frame that the rate reduction message is transmitted, or at a predetermined number of frames thereafter. Allowing remote station 6 to decrease the transmission rate unilaterally, without having to be reassigned by channel scheduler 12, reduces the processing delay and improves the quality of the communications on the reverse link. It is preferable that remote station 6 transmits at the maximum scheduled transmission rate since the reverse link capacity has already been allocated. Data transmission at the lower transmission rate can result in an under-utilization of the reverse link capacity.

Alternately, if remote station 6 determines that its available transmit power supports data transmission at a higher transmission rate and the queue size is large, remote station 6 can request for a rate increase during the scheduling period. The request for higher transmission rate can be transmitted to all cells supporting remote station 6 in soft handoff. If any one of the cells determines that the reverse link capacity for that cell is full, the request for higher transmission rate is denied. Otherwise, the request is routed to channel scheduler 12 which can consider the request during the scheduling period.

III. Remote Station Transmit Power Consideration

Each remote station 6 is constrained by the maximum transmit power available to it. The maximum transmit power is determined by FCC regulations, battery capacity, and the interference to other remote stations 6 in the CDMA network. Remote station 6 requires $E_{bi}$ energy-per-bit to transmit data to the cell for the requisite level of performance. For voice communication 1% FER is an acceptable level of performance but the requirement for data communication can be more stringent. The power constraint which should be satisfied by each remote station 6 is:

$$E_{bi} \cdot R_i < P_{max,i}, \quad (3)$$

where $E_{bi}$=required transmit energy-per-bit by the i-th remote station, $R_i$=transmission rate of the i-th remote station, and $P_{max,i}$=maximum transmit power available to the i-th remote station.

On the reverse link, the energy-per-bit-to-noise-plus-interference ratio $E_b/(N_o+I_o)$, as measured at the cell, for each remote station 6 is controlled such that the requisite level of performance is maintained while minimizing the transmit power of remote station 6. This power control is critical on the reverse link because the transmit power of each remote station 6 is an interference to other remote stations 6 in the CDMA network. Minimizing the transmit power reduces the interference and increases the reverse link capacity.

As remote station 6 moves about the network, the effect of multipath and fading drastically alter the $E_b/(N_o+I_o)$ of the signal received at the cell. In fact, the dynamic variation in received $E_b/(N_o+I_o)$ can be more that 60 dB during a communication. To combat this wide variation, each remote station 6 maintains a power control mechanism which dynamically adjusts the transmit power to combat changes in the channel condition. For the CDMA system which conforms to the IS-95A standard, each remote station 6 is allowed a range of 60 dB for the reverse link power control and the transmit power can be increased or decreased by 1 dB per 1.25 msec.

The transmit power of remote station 6 is backed off from the maximum transmit power to maintain headroom. The headroom allows the power control mechanism of remote station 6 to adjust the transmit power to combat changes in the channel condition and to account for variations in the transmission rate of the unscheduled tasks. Therefore, equation (3) can be expressed as $$E_{bi} \cdot R_i < \alpha \cdot P_{max,i}, \quad (4)$$

where $\alpha$ is the fraction of the transmit power that is reserved for backoff. For example, if half of the maximum transmit power is reserved for backoff then $\alpha=0.5$ (3 dB of backoff power). The required energy-per-bit $E_{bi}$ can be predicted from the transmit power $\underline{P}_i$ and the transmission rate $\underline{R}_i$ for the prior scheduling period as follows:

$$\hat{E}_{bi} = \frac{\underline{P}_i}{\underline{R}_i} \cdot \delta(\underline{R}_i, R_i), \quad (5)$$

where $\hat{E}_{bi}$ is the predicted energy-per-bit required for the upcoming scheduling period, $\delta(\underline{R}_i, R_i)$ is the correction factor to be used if the prior transmission rate $\underline{R}_i$ and the scheduled transmission rate $R_i$ have different required energy-per-bit. The frame error rate (FER) can also be taken into account to predict the required energy-per-bit. Specifically, the predicted energy-per-bit can be increased if the FER is high or decreased if the FER is low. Thus, equation (5) becomes:

$$\hat{E}_{bi} = \frac{\underline{P}_i}{\underline{R}_i \cdot f(Pe)} \cdot \delta(\underline{R}_i, R_i), \quad (6)$$

where Pe is the FER and f(Pe) is a function of Pe. f(Pe) can be implemented as an equation or a look-up table. In general, f(Pe) is a positive value and increases as Pe decreases. Combining equation (4) and (6), the maximum transmission rate which can be assigned to remote station 6 based on the available transmit power, the backoff power, and the predicted energy-per-bit required by remote station 6 becomes:

$$R_{max,i} = \frac{P_{max,i} \cdot \alpha}{\hat{E}_{bi}}. \quad (7)$$

Equation (7) can be calculated at remote station 6 and the maximum transmission rate $R_{max}$ can be used by remote station 6, along with the queue size, to determine the requested transmission rate. Alternately, remote station 6 can convey the maximum transmit power $P_{max,i}$, the predicted required energy-per-bit $\hat{E}_{bi}$, and the queue size to channel scheduler 12 for consideration in assigning a transmission rate to remote station 6.

IV. Reverse Link Capacity

The capacity of the reverse link in a CDMA system is predominantly determined by the interference each remote station 6 causes to other remote stations 6. This is because each remote station 6 spreads the data over the system bandwidth and transmits the signal over the same frequency band. The cell receives the power transmitted by all remote stations 6 and demodulates the signal of each remote station 6. The total power received by the cell from M remote stations 6, for the scheduled and unscheduled tasks, can be expressed as:

$$P_{total} = P_r + \sum_{i=1}^{M} P_i, \quad (8)$$

where $P_{total}$=total power received by the cell, $P_r$=power received by the cell that is not from the same cell scheduled tasks, $P_i$=power received from scheduled task of the i-th remote station, and M=number of transmitting scheduled remote stations.

The $E_b/(N_o+I_o)$ for a given remote station 6 is given by:

$$X_i = \frac{E_{bi}}{N_o + I_o} = \frac{W}{R_i} \cdot \frac{P_i}{P_r + \sum_{j \neq i}^{M} P_j}, \quad (9)$$

where $E_{bi}$=energy-per-bit for the i-th remote station, $N_o$=background noise density of the system, and $I_o$=interference to the signal received from the i-th remote station by other sources in the system.

Each remote station 6 requires different $E_b/(N_o+I_o)$ for the requisite level of performance. In fact, a particular remote station 6 can require different $E_b/(N_o+I_o)$ at different times during a communication with the cell. The major factor affecting the required $E_b/(N_o+I_o)$ is the channel condition. For example, the speed at which remote station 6 moves about the CDMA network affects the amount of fading and, therefore, the channel condition. At low speed, the power control mechanism is effective in counteracting the slow fades and the required $E_b/(N_o+I_o)$ is low. At high speed, the power control is not effective in counteracting the fast fading and the effect of interleaving is increasingly beneficial. At an intermediate speed, the required $E_b/(N_o+I_o)$ is the highest because neither the power control nor the interleaving is as effective. Other factors can also effect the channel condition and, thus, the required $E_b/(N_o+I_o)$.

Combining equation (8) and (9) and approximating the summation term in the denominator of equation (9) with the summation term in equation (8) yield:

$$P_{total} = \frac{P_r}{1 - \sum_{i=1}^{M} X_i \frac{R_i}{W}}. \quad (10)$$

The total received power $P_{total}$ is highly related to the reverse link capacity. The term $\Sigma X_i R_i/W$ in the denominator of equation (10) relates to the loading of the system. As $\Sigma X_i R_i/W$ approaches 1.0 in equation (10), $P_{total}$ approaches infinity, an operating point which cannot be reached by the system. Higher loading on the reverse link results in higher level of interference. The higher level of interference forces remote station 6 to transmit at higher power to maintain the requisite level of performance. Since the transmit power of each remote station 6 has an upper bound, the upper bound of $P_{total}$ is limited to guarantee the coverage for the unscheduled tasks. The operating point $P_{max}$ depends on the system design and is related to the achievable $E_{bi}/(N_o+I_o)$ of remote station 6 located at the cell edge. $E_{bi}/(N_o+I_o)$ is directly related to the FER performance. Operating at higher loading results in worse $E_{bi}/(N_o+I_o)$ for the unscheduled users at the edge of the coverage area and, correspondingly, higher FER.

In the exemplary embodiment, the cell contains two power control loops for each remote station 6 to maintain the requisite level of FER performance while minimizing interference to other remote stations 6. The first power control loop, referred to as the inner loop, adjusts the transmit power of remote station 6 such that the signal quality, measured by $E_b/(N_o+I_o)$, as received at the cell is maintained at a set point. The cell measures the $E_{bi}/(N_o+I_o)$ of the received signal and transmits a control signal to remote station 6 commanding remote station 6 to increase the transmit power, by 1 dB step increment, if the measured $E_b/(N_o+I_o)$ is below the set point. Alternately, the cell commands remote station 6 to decrease the transmit power if the measured $E_b/(N_o+I_o)$ is above the set point. The inner loop adjusts the transmit power of remote station 6 such that the transmit power is minimized while maintaining the measured $E_b/(N_o+I_o)$ equal to the set point. The second power control loop, referred to as the outer loop, adjusts the set point such that the desired level of performance, as measured by the frame-error-rate (FER), is maintained. The cell increases the set point if the measured FER is higher than a predetermined level. Conversely, the cell decreases the set point if the FER is lower than the predetermined level. To maintain stability between the two loops, the time constant of the outer loop is made slower than that of the inner loop. In addition, remote station 6 may utilize an open loop power control system in which it adjusts its transmit power in accordance with changes in the power of the received forward link signals.

Channel scheduler 12 assigns the data transmission rate for the scheduled tasks for each remote station 6 while maintaining $P_{total}$ below $P_{max}$. The required $E_{bi}/(N_o+I_o)$, or $X_i$, for remote station 6 can be predicted by using the set point $X_i$ of remote station 6 for the prior scheduling period ($X_i=\gamma_i$). The set point is a good prediction of the required $E_{bi}/(N_o+I_o)$ because the outer loop maintains the set point at the setting which produces the desired level of performance.

The set point is not a good estimate of the required $E_{bi}/(N_o+I_o)$ in certain extreme circumstances. In the first situation, remote station 6 transmits at the maximum transmit power but the FER is still high. In this case, the power control loop will keep increasing the set point. In the second situation, remote station 6 is in soft handoff with multiple cells and each cell measures a different $E_b/(N_o+I_o)$. To minimize interference to other remote stations 6 in the system, remote station 6 decreases the transmit power if any cell commands remote station 6 to decrease power. Therefore, for the cells with weaker reverse links, the measured $E_b/(N_o+I_o)$ is lower than the set point. And in the third situation, the current transmission rate and the scheduled transmission rate have different required $E_b/(N_o+I_o)$.

When the measured $E_b/(N_o+I_o)$ is lower than the set point, the FER at the cell is likely to be high. In this situation, the inner power control loop attempts to increase the transmit power to maintain the measured $E_b/(N_o+I_o)$ at the set point. If this fails and excessive PER occurs, channel scheduler 12 recognizes that the channel condition is degraded and can place remote station 6 in the hold state until the channel condition improves.

The power $P_r$ received by the cell that is not from the same cell scheduled tasks can be predicted by measurements from one or more prior scheduling period by subtracting the power received for the scheduled tasks from the total power received by the cell as follows $$\hat{P}_r = P_{total}\left(1 - \sum_{i=1}^{M} \gamma_i \frac{R_i}{W}\right), \quad (11)$$

where $\hat{P}_r$ is the predicted received power at the cell that is not from the same cell scheduled tasks for the upcoming scheduling period and $P_{total}$ is the total power received by the cell for the prior scheduling period. $\hat{P}_r$ can also be predicted from other system measurements. Substituting $P_r$ in equations (10) with $\hat{P}_r$ from equation (11) and rearranging the terms, the capacity for the reverse link can be expressed as:

$$\sum_{i=1}^{M} \gamma_i \frac{R_i}{W} \leq 1 - \frac{P_{total}}{P_{max}} \cdot \left(1 - \sum_{i=1}^{M} \gamma_i \frac{R_i}{W}\right). \quad (12)$$

Equation (12) indicates that the available reverse link capacity, e.g. the data transmission rate which can be assigned for the upcoming scheduling period, can be determined from the information from prior scheduling periods. The term on the right hand side of equation (12) indicates the reverse link capacity available for the upcoming scheduling period and is based on information from the prior scheduling period.

In allocating data transmission rate for the scheduled tasks, the value of $P_{max}$ can be used to adjust the total reverse link capacity to be scheduled to remote stations 6. $P_{max}$ can be adjusted according to the statistics of $P_{total}$ or the statistics of the FER. For example, if the averaged FER increases or the average of $P_{total}$ is too high, channel scheduler 12 can reduce $P_{max}$ for the upcoming scheduling period, thereby operating the reverse link at a lower loading to improve the FER.

V. Soft Handoff

At any given moment, it is possible that all remote stations 6 in a CDMA network are in soft handoff between cells. Each remote station 6 in soft handoff communicates with two or more cells simultaneously. The use of soft handoff in the CDMA system is discussed in detail in the aforementioned U.S. Pat. No. 5,267,261.

In assigning a maximum scheduled transmission rate to remote station 6 in soft handoff, channel scheduler 12 ensures that each cell participating in the soft handoff satisfies the constraint of equation (2). At the start of each scheduling interval, selector elements 14 sends the active member set of each remote station 6 in the CDMA network to channel scheduler 12. The active member set contains the list of cells in communication with remote station 6. For each cell in the active member set, channel scheduler 12 calculates the maximum transmission rate which can be supported by the cell. The maximum supportable transmission rates from all cells on the active member set form a list of possible data transmission rates. Since equation (2) must be satisfied for all cells, the minimum data transmission rate from the list of maximum supportable transmission rates satisfies the constraint of equation (2) for all cells. Thus, the maximum transmission rate which can be assigned to a particular remote station 6 is the minimum of the list of maximum supportable transmission rates.

VI. Data Queue Size

In the present invention, the queue size of remote station 6 is taken into consideration in assigning the maximum scheduled transmission rate. The queue size is indicative of the amount of data to be transmitted by remote station 6 as of the time remote station 6 receives the data. At the start of each scheduling period, the queue size of all scheduled tasks are sent to channel scheduler 12. Channel scheduler 12 assigns a high speed transmission rate in accordance with the queue size. For example, channel scheduler 12 can assign a high speed transmission rate only if the queue size is above a predetermined threshold. Alternately or additionally, channel scheduler 12 can assign a high speed transmission rate if the rate of change in the queue size is above another predetermined threshold. Furthermore, channel scheduler 12 can assign a high speed transmission rate if the queue size of remote station 6 approaches the maximum queue size. In this regard, channel scheduler 12 can assist remote stations 6 which are nearing its storage capacity limit.

In the exemplary embodiment, channel scheduler 12 assigns the minimum transmission rate such that the data in the queue can be transmitted during the K frame scheduling period. If the queue size is small, channel scheduler 12 ignores the task since the small amount of data can be transmitted within the maximum unscheduled transmission rate which is assigned to each remote station 6 in communication with a cell.

A scheduling delay exists from the time the data is made available to remote station 6 to the time of actual data transmission at the high speed transmission rate. The scheduling delay is due to the processing delays, which, in the exemplary embodiment, can be seven frames in duration. In the exemplary embodiment, the queue size is transmitted to channel scheduler 12 at the start of each scheduling period. Channel scheduler 12 adjusts the queue size to take into account any predictable changes to the queue size during the scheduling delay. Specifically, the data which is to be transmitted to the cell during the scheduling delay and new data which is known to arrive during the scheduling delay are considered in adjusting the queue size. Furthermore, data which is to be retransmitted is also taken into account in the queue size prediction.

The amount of data transmitted during the scheduling delay can be predicted by summing the maximum scheduled transmission rate which is assigned to remote station 6 for each frame in the scheduling delay. This is a moderately accurate adjustment to the queue size since, in most cases, remote station 6 transmits at the maximum scheduled transmission rate. If remote station 6 transmits at a lower transmission rate, e.g. maybe due to inadequate transmit power, the actual queue size is larger than the adjusted queue size. Transmission of the additional data in the queue can be scheduled at the subsequent scheduling period.

Figure 10:
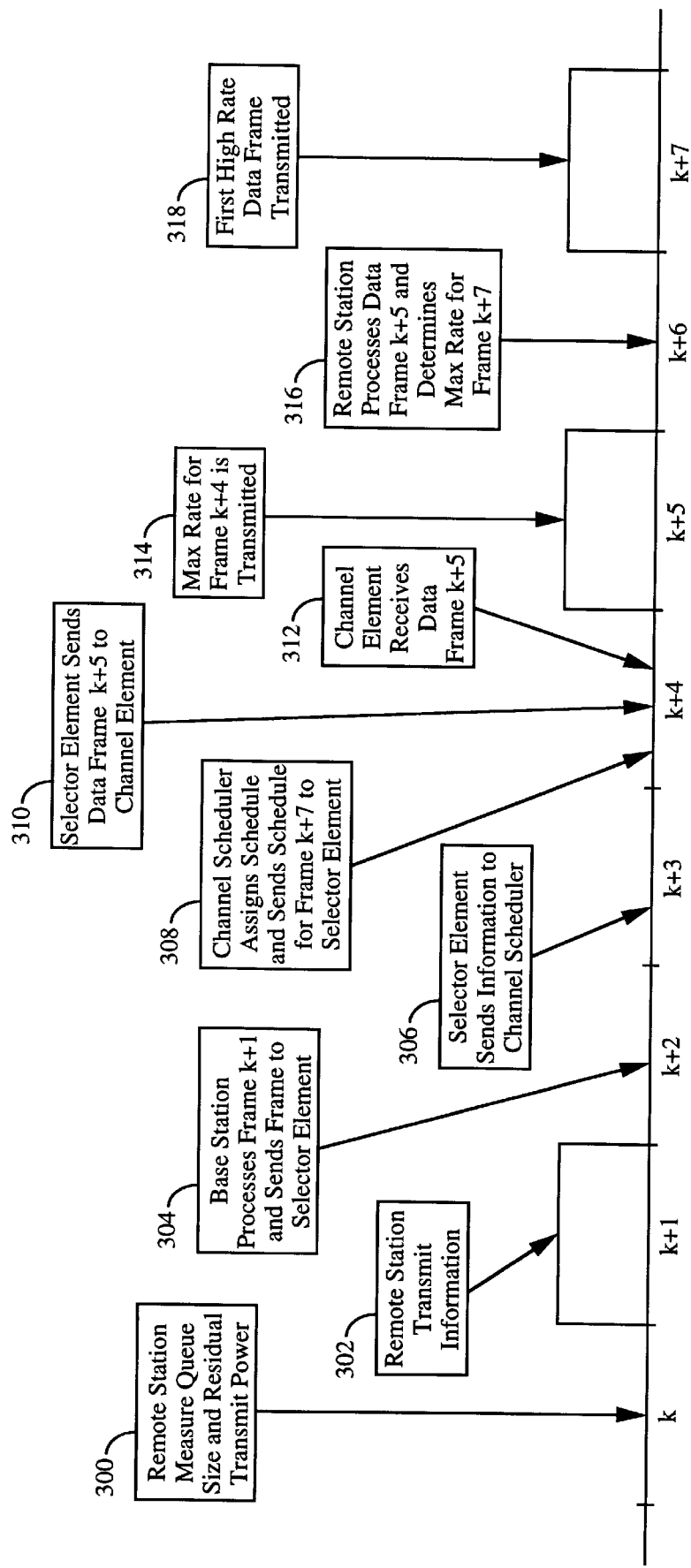
FIG. 10 is a timing diagram showing the transmission rate assignment and the data transmission at the assigned transmission rate.

Referring to FIG. 10, at frame k, remote station 6 measures the queue size of the data to be transmitted. At frame k+1, remote station 6 sends the queue size to channel scheduler 12. Because of scheduling delay, channel scheduler 12 knows that data transmission at the high speed transmission rate does not occur until frame k+7. Channel scheduler 12 also knows that some of the data in the queue is transmitted during the scheduling delay, the time between frame k+1 and frame k+6. Data transmission during the scheduling delay is at or below the maximum scheduled transmission rate assigned to frames k+1 through k+6. Therefore, channel scheduler 12 adjusts the queue size as it appears at frame k+7, by subtracting the amount of data to be transmitted during frame k+1 through frame k+6. Data which channel scheduler 12 knows will arrive between frame k+1 and k+6 at remote station 6 is added to the calculated queue size.

VII. High Speed Data Transmission

The reverse link rate scheduling method and apparatus of the present invention can be applied to any communication system capable of variable rate data transmission. For example, the present invention is applicable to a CDMA system, a GLOBALSTAR system, a time division multiple access (TDMA) system, or a frequency division multiple access (FDMA) system. The application of the present invention to a CDMA system or other variable rate communication systems, using the concept of a single variable rate channel, or multiple channels having a fixed rate, or a combination of variable and fixed rate channels, are within the scope of the present invention.

In the first embodiment, high speed data transmission occurs over a single variable rate channel. During the initiation of a call with the cell, remote station 6 is assigned the maximum unscheduled transmission rate of 1 (or 9.6 Kbps) on the variable rate channel. Therefore, remote station 6 can transmit unscheduled transmissions at any rate up to 1, including rate ⅛, ¼, ½ and 1. Remote station 6 is not allowed to transmit at higher transmission rates unless permitted by channel scheduler 12. The variable rate channel as used in this manner is also referred to as a traffic channel in this specification. For high speed data transmission, remote station 6 can be assigned a maximum scheduled transmission rate greater than 1. Remote station 6 can then transmit at higher rates, up to the maximum scheduled transmission rate, for high speed data transmission.

In the second embodiment, high speed data transmission occurs over multiple channels, herein after referred to as traffic channel and secondary code channel. The traffic channel is assigned to each remote station 6 during the call set up with a cell and allows unscheduled transmission up to a maximum unscheduled transmission rate of 1. The secondary code channels can be fixed or variable rate channels. The concept and implementation of secondary code channels for use in high speed data transmission are described in detail in U.S. patent application Ser. No. 08/798,951, entitled "METHOD AND APPARATUS FOR FORWARD LINK RATE SCHEDULING", filed Feb. 11, 1997, assigned to the assignee of the present invention and incorporated by reference herein.

In the exemplary embodiment, channel scheduler 12 equates the maximum scheduled transmission rate to a set of secondary code channels. Remote station 6 is directed to transmit data over the assigned secondary code channels. The identity of the assigned secondary code channels is transmitted to remote station 6 in one of three embodiments. In the first embodiment, the identity of each secondary code channel is transmitted to remote station 6 at each scheduling period. This requires more overhead but allows the most flexibility.

In the second embodiment, the secondary code channels are grouped into channel sets, with each channel set defined by a unique grouping of secondary code channels. The definition of the channel sets is transmitted to remote station 6 during the call set up stage of a communication with a cell or during the call set up stage of a soft handoff. Channel scheduler 12 assigns the maximum scheduled transmission rate and selects a channel set corresponding to the maximum scheduled transmission rate. The identity of the channel set is transmitted to remote station 6. This embodiment requires less overhead than the first embodiment since only the identity of the channel set, and not the identity of each secondary code channel, is transmitted to remote station 6.

The third embodiment is a subset of the second embodiment. Each channel set is defined by a Walsh code and the member of channel set N is composed of secondary code channels 1 through 5. The assigned transmission rate is equated to a Walsh code and the Walsh code is transmitted to remote station 6. Higher transmission rate is equated with more secondary code channels and a higher Walsh code. Remote station 6 transmits data over all secondary code channels associated with the Walsh code. For example, Walsh code 5 is equated with secondary code channels 1 through 5. An assignment of Walsh code 5 indicates that remote station 6 can transmit data over secondary code channels 1 through 5. If remote station 6 decides to transmit at a lower transmission rate, e.g. using three secondary code channels, remote station 6 transmits Walsh code 3 to the cell indicating the intention to transmit over secondary code channels 1 through 3.

VIII. Encoding and Modulation of Secondary Code Channels

For the second embodiment described above, wherein high speed data transmission occurs over secondary code channels, the encoding and modulation of secondary code channels for the reverse link can be accomplished by the embodiments described below. Other embodiments can also be used to transmit data over secondary code channels on the reverse link. The first embodiment is described in detail in the aforementioned U.S. patent application Ser. No. 08/654,443. The encoder and modulator is described below to facilitate understanding of the present invention.

Figure 4:
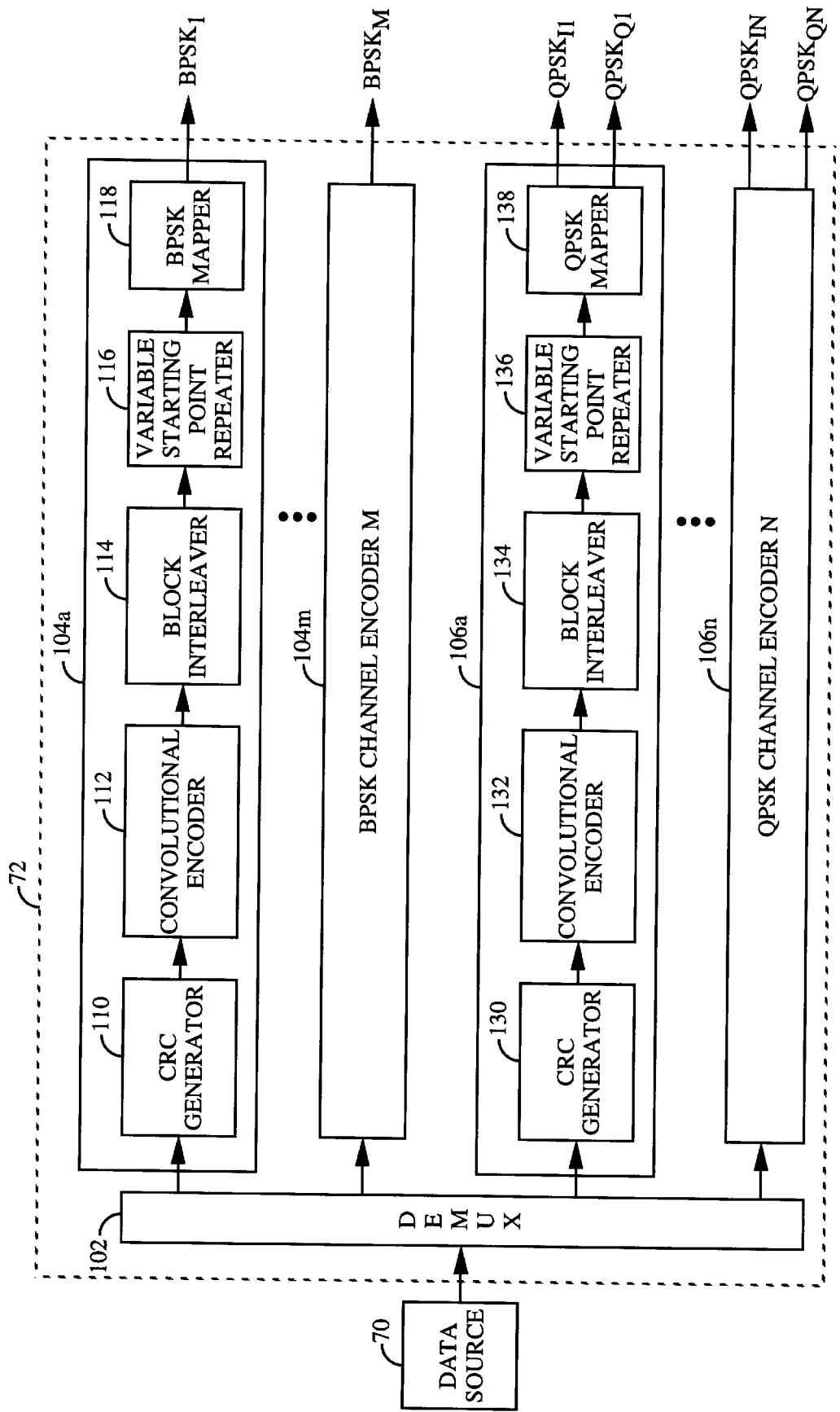
FIG. 4 is a block diagram of the exemplary encoder within the remote station.

The exemplary block diagram of encoder 72 of the first embodiment is shown in FIG. 4. Data source 70 contains the large amount of information which is to be transmitted to the cell. The data is provided to a bank of BPSK and QPSK channel encoders 104 and 106 through DEMUX 102. DEMUX 102 demultiplexes the data from data source 70 to the selected BPSK or QPSK channel encoders 104 and 106. BPSK and QPSK channel encoders 104 and 106 encode and reorder the data and provide the encoded data to modulator 74. The type of channel encoder to be selected, BPSK or QPSK, is dependent on the system design. Encoder 72 can be configured with a bank of BPSK channel encoders 104, a bank of QPSK channel encoders 106, or a combination of BPSK and QPSK channel encoders 104 and 106.

Within BPSK channel encoder 104, the data from data source 70 is partitioned into data frames and provided to CRC generator 110. CRC generator 110 generates the CRC bits for the data frames, inserts the code tail bits, and provides the CRC encoded data to convolutional encoder 112. Convolutional encoder 112 convolutionally encodes the CRC encoded data. In the exemplary embodiment, convolutional encoder 112 has a constraint length K=9 and is rate ¼, although other constraint lengths and rates can be used. A K=9, rate ¼ encoder provides additional coding gain over the rate ½ and rate ⅓ encoders used in the reverse link transmissions of voice data. Block interleaver 114 receives the encoded bits and reorders the bits to provide time diversity. The time diversity spreads the burst errors received by the cell and improves the performance of the Viterbi decoding at the cell.

Variable starting point repeater 116 receives the interleaved data and repeats each bit $N_B$ number of times to provide a constant output symbol rate of 307.2 Kbps. In accordance with the IS-95A standard, each code channel frame is 20 msec long and corresponds to 6,144 symbols at the 307.2 Kbps symbol rate. If the value of $N_B$ is not an integer, the final repetition is only performed for a portion of the encoded data. In the exemplary embodiment, variable starting point repeater 116 uses a different starting point to begin the repetition for each data frame. The resulting repeated symbols are provided to BPSK mapper 118 which generates a +1 or −1 value for each repeated symbol.

QPSK channel encoder 106 functions in the almost same manner as BPSK channel encoder 104. The data from data source 70 is partitioned into data frames, routed through DEMUX 102, and provided to CRC generator 130. CRC generator 130 block encodes the data frames and provides the CRC encoded data to convolutional encoder 132. Convolutional encoder 132 convolutionally encodes the CRC encoded data with a rate ¼, K=9 encoder, although other rates and constraint lengths can also be used. Block interleaver 134 receives the encoded bits, reorders the bits, and provides the interleaved data to variable starting point repeater 136. Variable starting point repeater 136 repeats each bit $N_Q$ number of time to obtain a fixed output symbol rate of 614.4 Kbps. The repeated symbols are provided to QPSK mapper which groups the repeated symbols by two and generates one of four possible state for the in-phase (QPSK$_I$) and quadrature (QPSK$_Q$) outputs. For example, a grouping of (0,0) repeated symbols can correspond to QPSK$_I$=−1 and QPSK$_Q$=−1, a grouping of (0,1) repeated symbols can correspond to QPSK$_I$=−1 and QPSK$_Q$=+1, and so on. The symbol rate at the QPSK$_I$ and QPSK$_Q$ outputs is 307.2 Kbps.

In an alternative implementation of the first embodiment, data from data source 70 is provided directly to one CRC generator 110 which generates the CRC bits for the data frames being transmitted. The CRC encoded data is provided to one convolutional encoder 112 which convolutionally encodes the CRC encoded data. The encoded bits are provided to one block interleaver 114 which reorders the code bits to provide time diversity. The interleaved data is provided to a bank of variable starting point repeaters 116 and 136, one for each BPSK and QPSK channel encoder 104 and 106, through DEMUX 102. Combining the CRC block encoding, the convolutional encoding, and the block interleaving for all BPSK and QPSK channel encoders with a set of one CRC generator, one convolutional encoder, and one block interleaver minimizes the hardware requirement.

Figure 5:
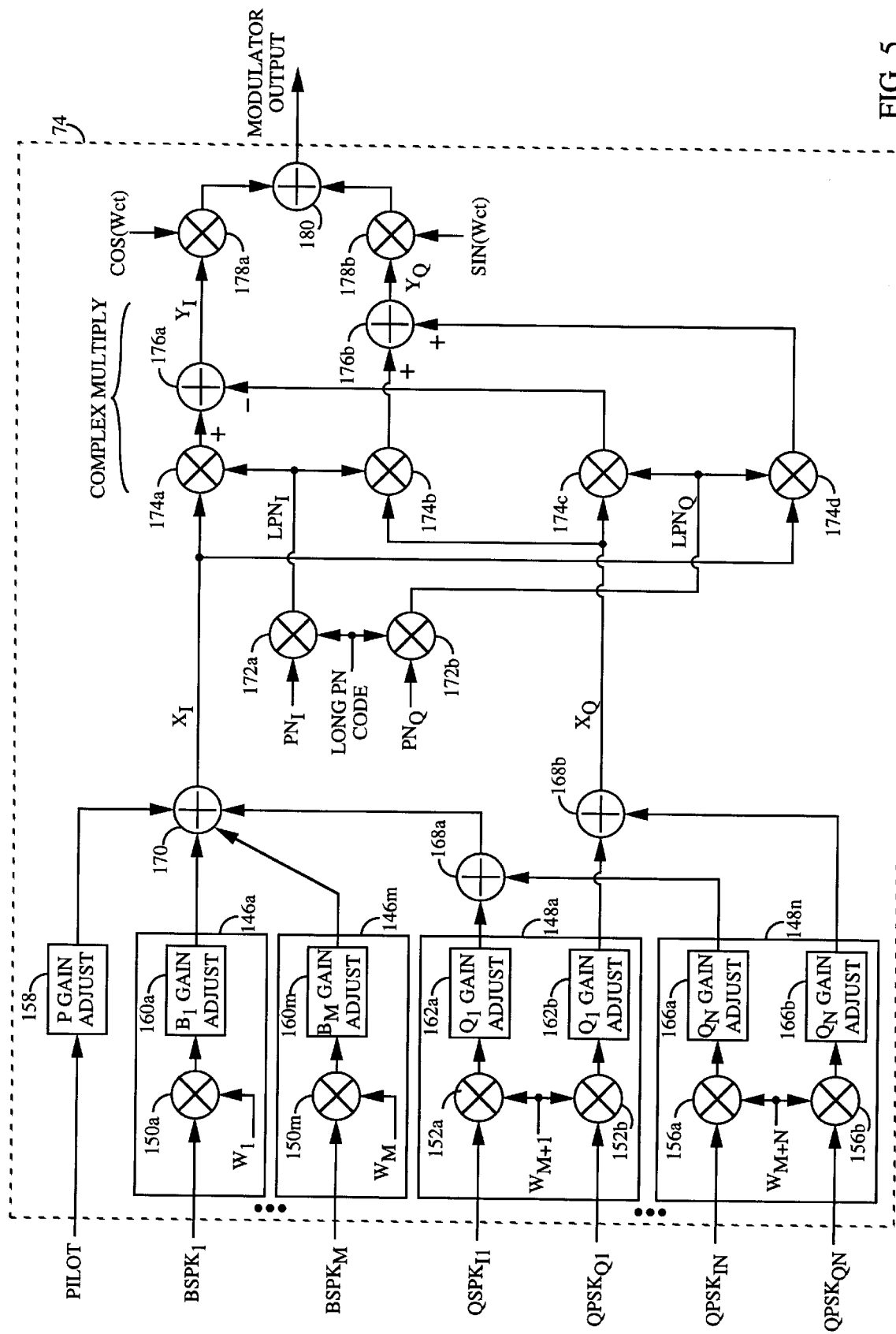
FIG. 5 is a block diagram of the exemplary modulator at the remote station.

The exemplary block diagram of modulator 74 within remote station 6 for the first embodiment is shown in FIG. 5. The BPSK, QPSK$_I$ and QPSK$_Q$ outputs from encoder 72 are provided to modulator 74. Each BPSK output is provided to a unique BPSK Walsh modulator 146. Within BPSK Walsh modulator 146, the BPSK encoded data is modulated by a unique Walsh code by multiplier 150 and amplified by a unique gain by gain adjust 160. For example, BPSK$_1$ output is modulated by Walsh code W$_1$ and amplified by gain B$_1$. Likewise, each QPSK$_I$ and QPSK$_Q$ output pair is provided to a unique QPSK Walsh modulator 148. Within QPSK Walsh modulator 148, the QPSK encoded data is modulated by a unique Walsh code by multipliers 152–156 and amplified by a unique gain by gain adjust 162–166. For example, QPSK$_{I1}$ and QPSK$_{Q1}$ output pair is modulated by Walsh code W$_{M+1}$ and amplified by gain Q$_1$. Gain adjust 158 receives the PILOT signal, which in the exemplary embodiment is comprised of the logic level associated with a positive logic voltage, and adjusts the amplitude according to gain P. The PILOT signal contains no data but provides a reference carrier signal which RF unit 42 within base station 4 can use to coherently demodulate the data on the remaining BPSK and QPSK channels.

The Walsh code modulated and gain adjusted QPSK$_I$ signals are summed together by summer 168a. Likewise, the Walsh code modulated and gain adjusted QPSK$_Q$ signals are summed together by summer 168b to form the signal X$_Q$. The Walsh code modulated and gain adjusted BPSK signals, the gain adjusted PILOT signal, and summer 168a output are summed together by summer 170 to form the signal X$_I$.

The subsequent signal processing functions to further spread the signals X$_I$ and X$_Q$, with the long PN code and the short PN$_I$ and PN$_Q$ codes, and distributes the PN modulated signals evenly over both in-phase (I) and quadrature (Q) components of the QPSK modulated signal. First, the long PN code is modulated with the short PN$_I$ code by multiplier 172a to produce the signal LPN$_I$. The long PN code is also modulated with the short PN$_Q$ code by multiplier 172b to produce the signal LPN$_Q$.

Multipliers 174 and summers 176 perform a complex multiply of the signals X$_I$ and X$_Q$ and the LPN$_I$ and LPN$_Q$ codes. Using j to represent the imaginary part of a complex number and multiply the two complex terms above, the following equation can be obtained:

$$(X_I+jX_Q)\cdot(LPN_I+jLPQ_Q)=(X_I\cdot LPN_I-X_Q\cdot LPN_Q)+j(X_I\cdot LPN_Q+X_Q\cdot LPN_I) \quad (13)$$

To obtain the above result, the signal X$_I$ is first modulated with LPN$_I$ by multiplier 174a to produce the product term X$_I$·LPN$_I$, and with LPN$_Q$ by multiplier 174d to produce the product term X$_I$·LPN$_Q$. Next, the signal X$_Q$ is modulated with LPN$_I$ by multiplier 174b to produce the product term X$_Q$·LPN$_I$, and with LPN$_Q$ by multiplier 174c to produce the product term X$_Q$·LPN$_Q$. The four intermediate product terms are combined by adders 176a and 176b such that the resultant signals Y$_I$=X$_I$·LPN$_I$−X$_Q$·LPN$_Q$ and Y$_Q$=X$_I$·LPN$_Q$+X$_Q$·LPN$_I$. The signals Y$_I$ and Y$_Q$ are filtered (not shown in FIG. 5) and modulated with an in-phase sinusoidal COS (Wct) and a quadrature sinusoidal SIN(Wct) by mixers 178a and 178b, respectively. The I component from mixer 178a and the Q component from mixers 178b are combined by summer 180 and the resultant QPSK modulator output is provided to front end 62.

Modulator 74 evenly distributes the data from BPSK and QPSK channel encoders 104 and 106 over both I and Q components of the QPSK modulator output. In the first example, assume that only BPSK channel encoders 104 are present and that QPSK channel encoders 106 do not exist. In this case, X$_I$ contains the BPSK data and X$_Q$=0. Substituting these quantities for equation (13) above, Y$_I$=X$_I$·LPN$_I$ and Y$_Q$=X$_I$·LPN$_Q$. Thus, the BPSK data from BPSK channel encoder 104 is spread with different short PN codes and evenly distributed between the I and Q components.

In the next example, assume that only QPSK channel encoders 106 are present and that BPSK channel encoders 104 do not exist. In this case, X$_I$ contains the QPSK$_I$ data and X$_Q$ contains the QPSK$_Q$ data. The resulting signals become Y$_I$=X$_I$·LPN$_I$−X$_Q$·LPN$_Q$ and Y$_Q$=X$_I$·LPN$_Q$+X$_Q$·LPN$_I$. Thus, the QPSK$_I$ data is spread with different short PN codes and distributed evenly between the I and Q components. Likewise, the QPSK$_Q$ data is spread with different short PN codes and distributed evenly between the I and Q components. The minus sign in the equation for Y$_I$ results from the complex multiply operation.

As stated above, the number of BPSK or QPSK channel encoder is selected by system design. In exemplary embodiment, one BPSK Walsh modulator 146 is assigned to each BPSK channel encoder 104 and one QPSK Walsh modulator 148 is assigned to each QPSK channel encoder 106. Each pair of BPSK channel encoder 104 and BPSK Walsh modulator 146 is collectively referred to as a secondary code channel throughout the specification. Likewise, each pair of QPSK channel encoder 106 and QPSK Walsh modulator 148 is collectively referred to as a secondary code channel.

In the first embodiment, the data transmission rate over the BPSK and QPSK channels can be made variable, by changing the repetition value N$_I$ and N$_Q$. The inclusion of a pilot tone allows the cell to use partial coherent demodulation to improve the FER performance. The pilot tone allows the reverse link to operate at a lower E$_{bi}$/(N$_o$+I$_o$) for the same FER performance. Also, when the data transmission rate is high, the percentage of the transmit power utilized by the pilot tone is small. The disadvantage of the first embodiment is that the QPSK modulator output does not conform to the IS-95A standard for the modulated signal on the reverse link. Therefore, the modulated signal generated in accordance to the first embodiment is not backward compatible with the CDMA systems that conform to IS-95A standard.

Figure 6:
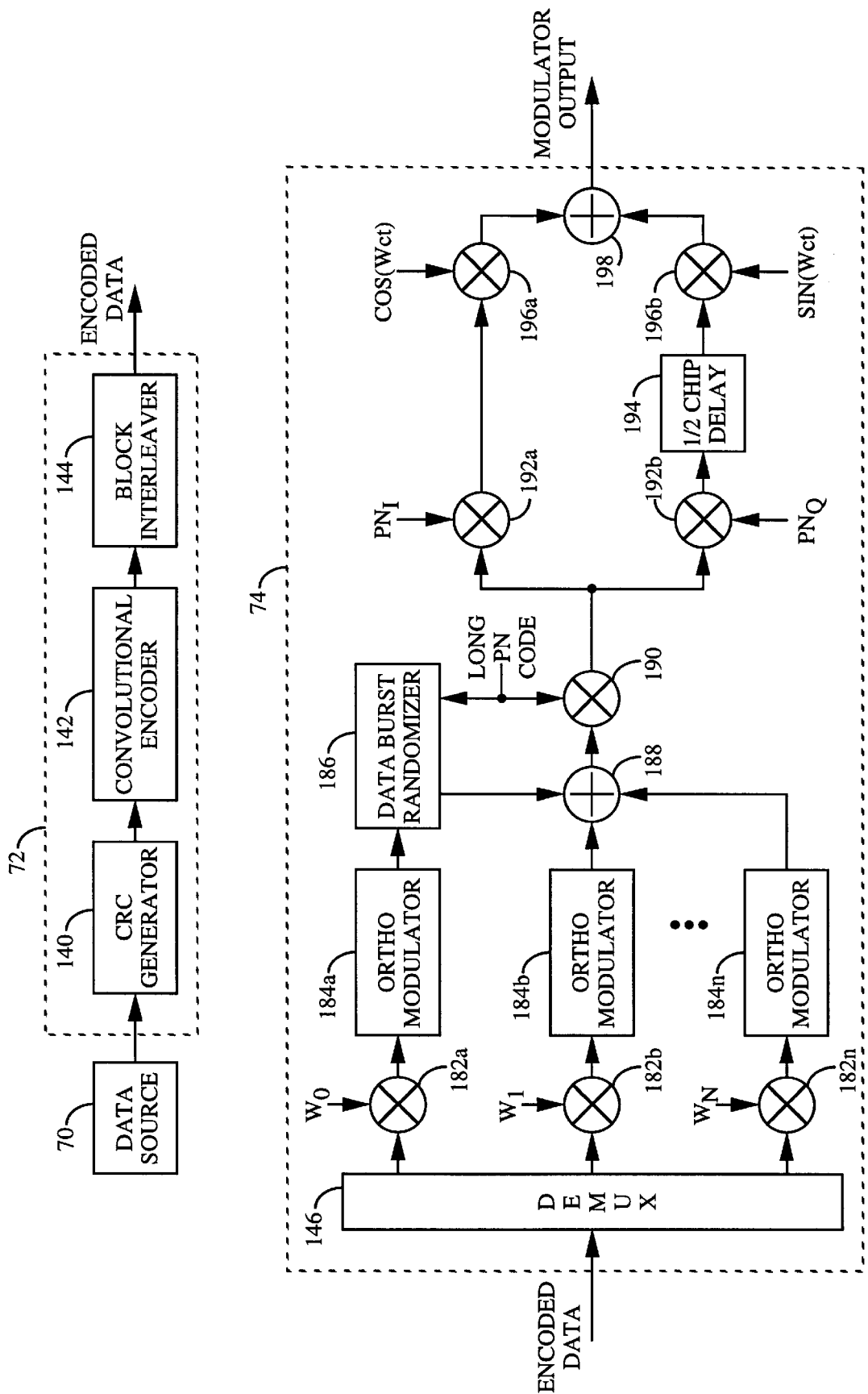
FIG. 6 is a block diagram of an alternative encoder and modulator structure at the remote station.

The exemplary block diagram of encoder 72 and modulator 74 of the second embodiment is shown in FIG. 6. The secondary code channels are created by the use of Walsh code spreading to provide orthogonality between the secondary code channels. The orthogonality improves signal detection at the cell by providing a correlated signal on the secondary code channel being demodulated and spreading the signals of other secondary code channels. The Walsh code spread signal is then signal mapped, in accordance with the IS-95A standard, to improve the signal detection. Finally, the mapped signal is spread by short PN codes to provide quadrature spreading, again to improve signal detection at the cell.

Referring to FIG. 6, data from data source 70 is provided to CRC generator 140 which generates the CRC bits for the data frames being transmitted and inserts the code tail bits. The CRC encoded data is provided to convolutional encoder 142 which convolutionally encodes the CRC encoded data. The encoded bits are provided to block interleaver 144 which reorders the encoded bits to provide time diversity. The interleaved data is provided to modulator 74.

Within modulator 74, the encoded data is routed through DEMUX 146 and provided to a bank of Walsh code modulators 182. Walsh code modulators 182 spreads the encoded data with unique Walsh codes to provide orthogonality between the code channels. The Walsh code modulated data is provided to ortho-modulator 184. Ortho-modulator 184 maps the input signal into another signal space using Walsh code mapping. The input bit sequence is grouped into groupings of 6-bits. Each 6-bit grouping selects a unique 64-chip Walsh sequence. The mapped signal from ortho-modulator 184a is provided to data burst randomizer 186. Data burst randomizer 186 turns off the transmitter within front end 62 when remote station 6 is transmitting at less than full rate to reduce the transmit power.

Since Walsh code $W_0$ is defined as the all zeros sequence (0, 0, . . . 0), Walsh code modulator 182a does not perform any function. Therefore, the first Walsh code channel $W_0$, comprising Walsh code modulator 182a, ortho-modulator 184a, and data burst randomizer 186, conforms to the signal processing defined by the IS-95A standard for the reverse link. The secondary Walsh code channels $W_1$–$W_N$, comprising Walsh code modulator 182 and ortho-modulator 184, are utilized as necessary without impacting the performance of the first Walsh code channel $W_0$. The outputs from the first Walsh code channel and secondary Walsh code channels are combined by summer 188 and the resultant signal is modulated with the long PN code by multiplier 190. The long PN code modulated signal is further spread by the short $PN_I$ and $PN_Q$ codes by multipliers 192a and 192b, respectively. The $PN_I$ modulated signal is mixed with the in-phase sinusoidal COS(Wct) by mixer 196a. The $PN_I$ modulated signal is delayed for half a chip, through delay 194, and mixed with the quadrature sinusoidal SIN(Wct) by mixer 196b. The I component from mixer 196a and the and Q component from mixer 196b are combined by summer 198 and the resultant OQPSK modulator output is provided to front end 62. This embodiment has the advantage of providing a modulated signal which is backward compatible with the modulated signal for the reverse link in accordance with the IS-95A standard. Each secondary Walsh code channel $W_1$–$W_N$ is referred to as a secondary code channel in this specification.

IX. CRC Bits

In accordance with IS-95A, the CRC bits are appended to each data frame to allow detection of frame error by the cell. The CRC bits are generated in accordance with the CRC polynomial specified by IS-95A. Specifically, for a data transmission rate of 9.6 Kbps, the specified polynomial is $g(x)=x^{12}+x^{11}+x^{10}+x^9+x^8+x^4+x+1$. For each data frame, twelve CRC bits are appended. In the present invention, the number of CRC bits can be increase or decrease, depending on the required detection certainty. More CRC bits allows detection of frame error with greater certainty but requires more overhead. Conversely, less CRC bits decreases the certainty of frame error detection but requires less overhead.

As stated above, depending on the hardware implementation, high speed transmission rate can occur over one variable rate channel or multiple secondary code channels. For the implementation wherein high speed data transmission occurs over secondary code channels, the data frame can be further partitioned into data portions, with each data portion being encoded into a code channel frame and transmitted over one secondary code channel. The following discussion on CRC bits generation is applied to the embodiment using secondary code channels, although the concept can be extended to other hardware embodiments. For simplicity, the following discussion assumes that each secondary code channel transmits at the maximum unscheduled transmission rate. Furthermore, the secondary code channel and the traffic channel are each referred to as a code channel.

In the embodiment wherein high speed data transmission occurs over multiple code channels, the CRC bits for the multiple code channels can be generated by at least two embodiments. In the first embodiment, each data portion is appended with its own set of CRC bits, similar to the IS-95A standard. This embodiment requires more overhead but allows detection of frame error on each code channel frame. Only the code channel frame received in error is retransmitted.

In the second embodiment, the data frame which is to be transmitted over the code channels assigned to remote station 6 within one frame is encoded by one CRC generator. The generated CRC bits can be transmitted in one of several modes. In the first mode, the data frame is partitioned into data portions as described above. The CRC bits are also partitioned and appended to each data portion. Thus, each code channel frame contains a data portion and some CRC bits. In the second mode, the CRC bits are transmitted over one code channel frame. All code channel frames, except the last code channel frame, contain only the data portion. The last code channel frame contains the CRC bits and some possibly data. The second mode provides time diversity of the CRC bits and improves frame error detection by the cell.

At the cell, the code channel frames are reassembled to the data frame. In the second embodiment, the cell is only able to determine whether all code channel frames are received correctly or whether one or more code channel frame error has occurred. The cell is not able to determine which ones of the code channel frames are received in error. Therefore, a data frame error dictates that all code channel frames for that data frame need to be retransmitted by the cell. The second embodiment has the advantage of using a smaller number of CRC bits for the data frame.

As an example, assume that high speed data transmission occurs over twelve code channels. In the first embodiment, each of the twelve data portions is appended with its own set of twelve CRC bits. A total of 144 CRC bits is required for the twelve code channel frames. These 144 CRC bits allow detection of frame error on each individual code channel frame. Therefore, if the code channel frame on a particular code channel is received in error, only the error frame needs to be retransmitted.

For the second embodiment, the entire data frame is encoded with one set of CRC bits. Preferably, the number of CRC bits used is less than the total number of CRC bits used in the first embodiment. In the example shown above, for twelve code channel frames, the number of CRC bits used is at least 12 but less than 144. Since there are approximately twelve times more data bits, more CRC bits is required to allow detection of frame error with greater certainty. Assuming that 24 CRC bits allows detection of frame error with the requisite level of certainty, the 24 CRC bits can be partitioned into twelve CRC blocks, with each CRC block containing two CRC bits. One CRC block is appended to each of the twelve data portions. Alternately, the 24 CRC bits can be transmitted over one code channel frame. At the cell, the data portions and the 24 CRC bits are reassembled. The cell is only able to determine whether all twelve code channel frames are received correctly. If a frame error is indicated, the cell is not able to determine which ones of the code channel frames are received in error. Therefore, all twelve code channel frames must be retransmitted by remote station 6. For a saving of 120 CRC bits in overhead, the cell is still able to detect frame error, but without the precision of the first embodiment. The second embodiment requires a tradeoff between less overhead and redundant retransmission of code channel frames.

X. Timing of the Reverse Link Rate Scheduling

The accuracy of the prediction of the available reverse link capacity for the unscheduled tasks is improved by making the prediction at a moment as close as possible to the time at which the estimate will be used. During the period of delay, from the time of the prediction to the time of the actual use, the status of the network may have changed. For example, other remote stations 6 may have started or stopped transmitting, remote stations 6 may have been added or dropped from the network, or the channel conditions may have changed. By limiting the processing delay to a small number of frames, the prediction of the available reverse link capacity for the scheduled tasks is sufficiently accurate for the present invention. In the exemplary embodiment, the processing delay is seven frames or less.

Channel scheduler 12 can make predictions at a short time intervals, e.g. by maintaining a short scheduling interval, to improve the accuracy of the predictions and allow channel scheduler 12 to quickly respond to changes in the reverse link demand. In the preferred embodiment, the predictions are made every K frames, the maximum scheduled transmission rates are assigned every K frames or reassigned every frame, and the schedule of the maximum scheduled transmission rates is transmitted to remote stations 6 every K frames.

An exemplary illustration of the timing diagram of the reverse link ate scheduling of the present invention is shown in FIG. 10. At frame k, emote station 6 has a large amount of data to transmit to the cell. Remote station 6 measures the queue size of the data and the total transmit power available to remote station 6 at block 300. At frame k+1, remote station 6 transmit the information to the cell at block 302. At frame k+2, base station 4 serving the cell receives the information and routes the information to selector element 14 at block 304. At frame k+3, the status of the entire CDMA network is measured by selector elements 14 and sent to channel scheduler 12 at block 306. In the exemplary embodiment, the status of the CDMA network includes the reverse link capacity available for scheduled tasks at each cell, the amount of data to be transmitted by each scheduled user, the total transmit power available to each remote station 6, the active member set of each remote station 6, and the priority of remote stations 6. At frame k+4, channel scheduler 12 assigns the maximum scheduled transmission rates and sends the scheduling information to selector element 14 at block 308. The maximum scheduled transmission rates are to be utilized at frame k+7.

Within frame k+4, selector element 14 sends the data frames which is to be transmitted at frame k+5 on the forward link to channel element 40 at block 310. Channel element 40 receives the data frames from selector element 14 within frame k+4 at block 312. At frame k+5, channel element 40 transmits the scheduling information containing the maximum scheduled transmission rate for frame k+7 to remote station 6 on the forward link at block 314. During frame k+6, remote station 6 processes the forward link signal, determines the maximum scheduled transmission rate, and reconfigures the hardware, if necessary, for data transmission at the high speed transmission rate at block 316. At frame k+7, the data is transmitted at or below the maximum scheduled transmission rate over the reverse link to base station 4 at block 318.

In the exemplary embodiment, the processing delay between the time remote station 6 determines it has a large amount of data to transmit to base station 4 to the time of data transmission at the high speed transmission rate is seven frames. At frame k, remote station 6 measures the queue size and the total transmit power available to it. At frame k+7, remote station 6 transmit the data at the high speed transmission rate to base station 4. For a CDMA system which conforms to the IS-95A standard, each frame of delay represents a 20 msec delay. In the exemplary embodiment, the seven frames of processing delay represents 140 msec of delay. This period of delay is short enough so that other communications on the reverse link is not significantly degraded. Furthermore, the initial prediction of the required reverse link capacity for the unscheduled tasks is not overly critical in the present invention because of the ability of channel scheduler 12 to continuously monitor the reverse link usage and dynamically reassigns the transmission rate of the scheduled tasks.

The above description of the exemplary embodiment represents one implementation of the present invention. Other variations in the timing of the reverse link rate scheduling routine from that described above can be contemplated and are within the scope of the present invention. For example, the processing delays represented by blocks 304, 306, 308, 310, and 312 can be shortened to one or two frames, instead of the three frames shown in FIG. 10, by optimizing the hardware to minimize processing delay.

The scheduling information containing the maximum scheduled transmission rates can be transmitted to remote stations 6 in one of a number of embodiments. In the first embodiment, certain bits in the code channel frame on the forward link is reserved for the scheduling information. In the second embodiment, the scheduling information is transmitted by the use of separate signaling messages. The signaling message can be transmitted to remote station 6 whenever there is a new assignment of a data transmission rate. Other embodiments to transmit the scheduling information using variations or combination of the above described embodiments can be contemplated and are within the scope of the present invention.

Figure 11:
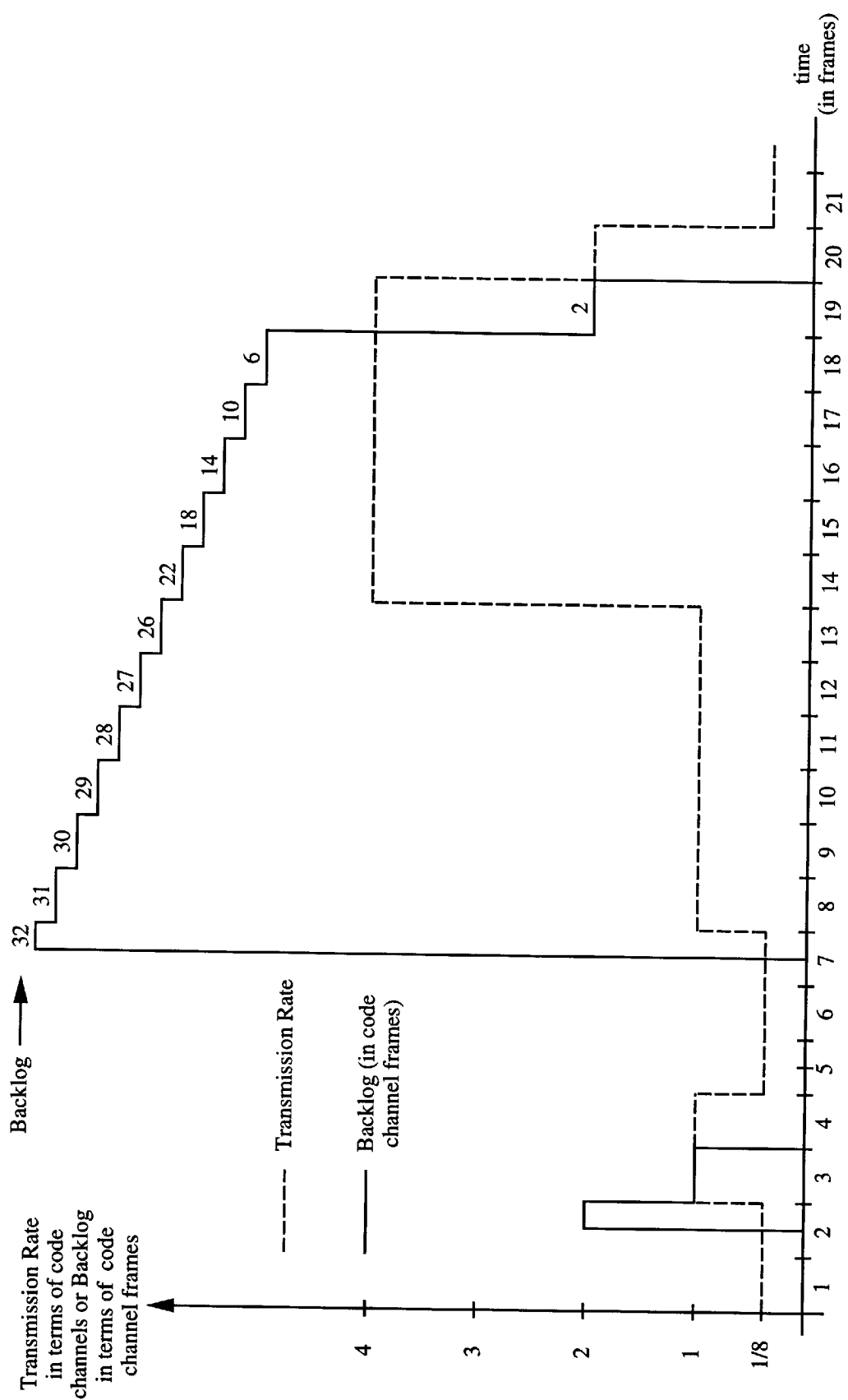
FIG. 11 is a diagram showing an exemplary utilization of the reverse link rate scheduling of the present invention.

An exemplary diagram of the reverse link rate scheduling and high speed data transmission of the present invention is shown in FIG. 11. As discussed above, remote station 6 is assigned a maximum unscheduled transmission rate (rate 1) for the duration of the communication with the cell. As shown in FIG. 11, remote station 6 transmits at rate ⅛ when idle and at rate 1 when transmitting data. The backlog of the data to be transmitted to the cell is represented by the solid line and given in terms of the number of code channel frames. The number of code channel frames equals to the maximum unscheduled transmission rate times the number of frames necessary to send the data. For example, 20 code channel frames can be transmitted by rate 1 over 20 frames or by a rate 4 over five frames. The following discussion pertains to the earlier described embodiment wherein the reverse link rate scheduling is performed every K frames and the transmission rate can be reassigned every frame. Also, remote station 6 can reduce the transmission rate unilaterally. The following example also applies to the embodiment wherein the reverse link rate scheduling is performed every frame.

In the example shown in FIG. 11, remote station 6 is assigned a maximum unscheduled transmission rate (rate 1) but remote station 6 has no data to transmit to the cell at frames 1 and 2. Therefore, remote station 6 transmits at rate ⅛ over the reverse link. During frame 2, remote station 6 receives two code channel frames for transmission to the cell. Remote station 6 transmits one code channel frame at frames 3 and 4, at rate 1, to bring the backlog to zero at the end of frame 3. Note that remote station 6 can transmit data up to rate 1 over the reverse link without scheduling. The data received during frame 2 is transmitted immediately at frame 3. Immediate transmission at or below rate 1 allows the signaling from the remote station 6 to the cell to get through quickly. For example, the TCP acknowledgment requires approximately 40 bytes and, with header compression, can be fitted into one data frame. The TCP acknowledgment can be transmitted immediately over the reverse link within one frame.

During frames 5, 6 and 7, remote station 6 transmits at rate ⅛ while idle and waiting for data. During frame 7, remote station 6 receives a large amount of data to transmit to the cell. At frame 8, remote station 6 transmit to the cell the queue size and the total transmit power available to remote station 6. At frame 10, channel scheduler 12 receives the information from selector element 14 and collects other information pertaining to the status of the network (e.g. the reverse link capacity available for each cell in the network). At frame 11, channel scheduler 12 assigns the maximum scheduled transmission rates and conveys the schedule to the cell. In this example, channel scheduler 12 assigns a maximum scheduled transmission rate four times the rate of the maximum unscheduled transmission rate (rate 4). At frame 12, the cell transmits the scheduling information to remote station 6 over the forward link. During frames 8 through 13, remote station 6 continues to transmit data at rate 1 and brings the backlog down to 26 code channel frames. During frame 13, remote station 6 receives the scheduling information and configures its hardware to transmit data at the high speed transmission rate. The high speed data transmission occurs at the maximum scheduled transmission rate (rate 4) at frames 14 through 19.

During frame 19, remote station 6 realizes that the queue is nearly empty and that a transmission rate of 2 is needed to transmit the remaining data at frame 20. At frame 20, remote station 6 transmits the rate reduction message to the cell indicating the intention to transmit at the lower transmission rate. Also at frame 20, remote station 6 transmits the two remaining code channel frames at the lower transmission rate.

Realizing that the queue is empty, at frame 21, remote station 6 request termination of transmission at the maximum scheduled transmission rate (rate 4). At frame 21, having transmitted all the data, remote station 6 transmits at rate ⅛ at frame 21 while idle and waiting for more data.

The above example shows that there is seven frames of processing delay between the time the data is made available to remote station 6 (at frame 7 in FIG. 11) and the time of data transmission at the high speed transmission rate (at frame 14 in FIG. 11). The example also illustrates that the transmission rate can be reduced by remote station 6 at each frame such that the reverse link is fully utilized at each frame.

XI. Priority Assignment

In order to optimize utilization of the reverse link, the maximum scheduled transmission rates for the scheduled tasks are assigned to remote stations 6 in accordance with the priority of remote stations 6. The reverse link capacity is assigned first to remote station 6 having the highest priority and last to remote station 6 having the lowest priority. Numerous factors can be used to determine the priority of remote station 6. The following discussion details an exemplary list of some of the factors which can be considered in assigning priority. Other factors can also be considered and are within the scope of the present invention.

An important factor in determining priority among remote stations 6 is the $E_b/(N_o+I_o)$ required by remote station 6. Remote station 6 which requires higher $E_b/(N_o+I_o)$ for the requisite level of performance consumes more capacity than remote station 6 which requires a lower $E_b/(N_o+I_o)$. In fact, for a given reverse link capacity, the symbol rate which can be transmitted by remote station 6 is inversely proportional to the required $E_b/(N_o+I_o)$. As an example, the reverse link capacity which supports data transmission at 38.4 Kbps by the first remote station 6 only supports data transmission at 9.6 Kbps by the second remote station 6 (¼ the symbol rate) if the required $E_b/(N_o+I_o)$ of the second remote station 6 is approximately 6 dB more than that of the first remote station 6. Therefore, it is preferable to allow remote station 6 which requires a lower $E_b/(N_o+I_o)$ to transmit first because less capacity is consumed.

Remote station 6 can be in soft handoff with multiple cells. Remote station 6 in soft handoff consumes more capacity because multiple cells support remote station 6 simultaneously. Therefore, higher throughput on the reverse link is obtained by assigning a low priority to remote station 6 which is in soft handoff. Also, remote station 6 in soft handoff is typically located near the edge of the cell and requires more transmit power for the same energy-per-bit at the cell.

Channel scheduler 12 can also consider the transmit energy-per-bit required by remote station 6 to transmit to the cell. The transmit power of remote station 6 is typically limited and the reverse link rate scheduling can attempt to conserve the battery power to prolong the operating life of remote station 6.

The optimal assignment of the maximum scheduled transmission rate is also dependent on the amount of data to be transmitted by remote station 6. The data to be transmitted is stored in a queue located within remote station 6. Thus, the size of the queue is indicative of the amount of data to be transmitted. At the start of each scheduling interval, the queue size of all scheduled tasks is sent to channel scheduler 12. If the queue size of a scheduled task is small, channel scheduler 12 removes the task from the rate scheduling routine. Transmission of a small amount of data can be completed within a satisfactory time period over the reverse link at or below the maximum unscheduled transmission rate. Channel scheduler 12 only assigns the high speed transmission rate, when necessary, for transmission of large amounts of data. Thus, the maximum scheduled transmission rate assigned to each remote station 6 can be approximately proportional to the queue size of the data to be transmitted.

The type of data to be transmitted is another important consideration in assigning priority among remote stations 6.

Some data types are time sensitive and require quick attention. Other data types can tolerate longer delay in transmission. Obviously, higher priority is assigned to data that is time critical.

As an example, inevitably, some of the transmitted data are received in error by the cell. The cell is able to determine a frame error by the use of the CRC bits appended to the code channel frames. Upon determination that a code channel frame has been received in error, the error indicator bit for that code channel frame is flagged and the cell informs remote station 6 of the frame error. Channel scheduler 12 then schedules the retransmission of the code channel frames received in error or remote station 6 can retransmit and inform the cell. At the cell, other signal processing may be dependent on the code channel frames received in error. Therefore, channel scheduler 12 or remote station 6 can place a higher priority on data being retransmitted than data being transmitted for the first time.

Conversely, repeated frame error indications by the cell can indicate that the reverse link is impaired. Therefore, allocating the reverse link capacity for repeated retransmission of the code channel frames received in error is wasteful. In this case, remote station 6 can be temporarily placed in the hold state or assigned a lower transmission rate. In the hold state, data transmission at the high speed transmission rate can be suspended until the reverse link condition improves. Remote station 6 can still transmit data at or below the maximum unscheduled transmission rate and the cell can continue to monitor the performance of the reverse link. Upon receiving indications that the reverse link condition has improved, channel scheduler 12 removes remote station 6 from the hold state and directs remote station 6 to resume high speed data transmission to the cell.

In assigning priority among remote stations 6, it may be desirable to distinguish remote stations 6 according to the type of data service being provided to remote stations 6. For example, a pricing structure can be established for different data transmission services. Higher priority is given to those services for which a premium price is charged. Through the pricing structure, the user on each remote station 6 can determine, individually, the priority and, therefore, the type of service the user can enjoy.

The priority of remote station 6 can also be made a function of the amount of delay already experienced by remote station 6. The available reverse link capacity is assigned first to remote station 6 having the highest priority. Consequently, remote station 6 having a low priority typically experiences longer transmission delay. As the amount of delay experienced by the low priority remote station 6 increases, the priority of remote station 6 can be upgraded. This prevents the data to be transmitted by the low priority remote station 6 from remaining in the queue state indefinitely. Without the priority upgrade, the low priority remote station 6 can suffer an intolerable amount of delay. The priority upgrade can be incremented in a manner such that a high quality communication of the scheduled and unscheduled tasks is achieved, while the system goals are maintained.

The factors are given different weights, depending on the set of system goals being optimized. As an example, to optimize the throughput on the reverse link, greater weight is given to the $E_b/(N_o+I_o)$ required by remote station 6 and whether remote station 6 is in soft handoff. This weighting scheme does not take into account data types and the priority of remote stations 6, thereby not addressing the system goal of fairness. An exemplary equation which assigns priority based on the FER, the prediction of the required $E_b/(N_o+I_o)$, and soft handoff can be expressed as:

$$C_i = \frac{1}{(1-Pe)} \cdot \sum_{j=1}^{L} \gamma_{i,j}, \qquad (14)$$

where $C_i$ is the priority of the i-th remote station 6, L is the number of cells supporting remote station 6 in soft handoff, Pe is the FER, and $\gamma_i$ is the set point of remote station 6 which is a prediction of the required $E_b/(N_o+I_o)$. In this example, a lower value for $C_i$ is equated to a higher priority. Other equations with different weighing factors can be contemplated and are within the scope of the present invention.

Alternately, a pricing structure can be maintained which allows the user on each remote station 6 to determine, individually, the priority of remote station 6. The willingness to pay a premium fee for the capacity indicates a higher level of importance. In this case, a system which attempts to maximize revenue and customer satisfaction allows the premium remote station 6 to transmit first, even though the transmission requires more capacity. Other weighting schemes can also be generated using the factors listed above, plus other factors not discussed, to achieve any set of system goals, and are within the scope of the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for scheduling data transmissions on a reverse link in a communication network comprising at least one cell and at least one scheduled user, said method comprising the steps of:

determining a reverse link capacity available for each of said at least one cell;

assigning a priority to each of said at least one scheduled user, wherein each priority is based on at least one factor selected from the group consisting of data time-sensitivity, energy-per-bit-to-noise-plus-interference ratio, soft handoff determination, transmit energy-per-bit required by said at least one scheduled user, amount of data to be transmitted, re-transmitted data, and type of service;

assigning a transmission rate to each of said at least one scheduled user;

sending said assigned transmission rate to said at least one scheduled user; and wherein said assigned transmission rate is based on said reverse link capacity available for each of said at least one cell and on said priority of each of said at least one scheduled user.

2. The method of claim 1 wherein said determining step, said assigning step, and said sending step are repeated every K frames, wherein K is an integer greater than or equal to one.

3. The method of claim 1 wherein said assigning step further comprises the step of:

determining an active member set for each of said at least one scheduled user, said active member set containing at least one cell in communication with said scheduled user;

wherein said assigned transmission rate is further based on said reverse link capacity available for each of said at least one cell in said active member set.

4. The method of claim 3 wherein said assigning step further comprises the step of:

receiving a queue size from each of said at least one scheduled user, said queue size being determinative of an amount of data to be transmitted by each of said at least one scheduled user;

wherein said assigned transmission rate is further based on said queue size from each of said at least one scheduled user.

5. The method of claim 1 wherein said assigning step further comprises the step of:

creating a priority list of scheduled users based on said assigned priorities, said priority list containing a plurality of said scheduled users, wherein each scheduled user is assigned a priority.

6. The method of claim 5 wherein said assigning step further comprises the steps of:

selecting a selected user from said priority list of scheduled users, said selected user having a highest priority among said at least one scheduled user in said priority list;

calculating a maximum supportable transmission rate for said selected user for each of said at least one cell of said selected user;

selecting a minimum transmission rate from said maximum supportable transmission rates, said minimum transmission rate being defined as a maximum transmission rate; and wherein said assigned transmission rate is at or below said maximum transmission rate.

7. The method of claim 6 wherein said assigning step further comprises the step of:

recommending a preferred transmission rate, said preferred transmission rate being based on a queue size of the data to be transmitted by said selected user;

wherein said assigned transmission rate is at or below said preferred transmission rate.

8. The method of claim 7 wherein said assigning step further comprises the steps of:

updating said reverse link capacity available for each of said at least one cell of said selected user to reflect a capacity allocated to said selected user; and removing said selected user from said priority list.

9. The method of claim 1 further comprising the step of:

reassigning said assigned transmission rate of zero or more of said at least one scheduled user to a temporary transmission rate, wherein said temporary transmission rate is based on said reverse link capacity available for each of said at least one cell.

10. The method of claim 9 wherein said reassigning step further comprises the steps of:

creating a temporary cell list of affected cells from said at least one cell in the communication network, said affected cells having inadequate transmit power to transmit data to said at least one scheduled user.

11. A method for scheduling data transmissions on a reverse link in a communication network comprising at least one cell and at least one scheduled user, said method comprising the steps of:

determining a reverse link capacity available for each of said at least one cell;

assigning a transmission rate to each of said at least one scheduled user;

sending said assigned transmission rate to said at least one scheduled user;

wherein said assigned transmission rate is based on said reverse link capacity available for each of said at least one cell;

reassigning said assigned transmission rate to a temporary transmission rate, wherein said temporary transmission rate is based on said reverse link capacity available for each of said at least one cell;

assigning a priority to each of at least one affected scheduled user selected from said at least one scheduled user in the communication network, wherein each priority is based on at least one factor selected from the group consisting of data time-sensitivity, energy-per-bit-to-noise-plus-interference ratio, soft handoff determination, transmit energy-per-bit required by said at least one scheduled user, amount of data to be transmitted, re-transmitted data, and type of service; and wherein said temporary transmission rate is further based on said priority of said affected scheduled users.

12. The method of claim 11 wherein said reassigning step further comprises the steps of:

creating a temporary priority list of affected scheduled users based on said assigned priorities, said temporary priority list containing a plurality of said affected scheduled users, wherein each affected scheduled user is assigned a priority.

13. The method of claim 12 wherein said reassigning step further comprises the steps of:

selecting an affected scheduled user from said temporary priority list of affected scheduled users, said selected affected scheduled user having a highest priority among said affected scheduled users in said temporary priority list;

calculating a maximum temporary supportable transmission rate for said selected affected scheduled user by one or more of said at least one cell of said selected affected scheduled user;

selecting a minimum transmission rate from said maximum temporary supportable transmission rates, said minimum transmission rate being defined as a maximum temporary transmission rate; and wherein said temporary transmission rate is at or below said maximum temporary transmission rate and said assigned transmission rate.

14. The method of claim 13 wherein said reassigning step further comprises the steps of:

updating said reverse link capacity available for one or more of said at least one cell of said selected affected scheduled user to reflect a capacity allocated to said selected affected scheduled user; and removing said selected affected scheduled user from said temporary priority list.

* * * * *

UNITED STATES PATENT AND TRADEMARK OFFICE
CERTIFICATE OF CORRRECTION

PATENT NO. : 5,914,950
DATED : June 22, 1999
INVENTOR(S) : Edward G. Tiedemann, Jr., et al.

It is certified that error appears in the above-identified patent and that said Letters Patent is hereby corrected as shown below:

On the title page, item 56 add the following:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | Name |
|---|---|---|---|---|---|---|---|---|---|---|---|---|
| | | 0 | 7 | 1 | 9 | 0 | 6 | 2 | 06/26/96 | EP | | | AT&T CORP. |
| | | 9 | 6 | 3 | 7 | 0 | 8 | 1 | 11/21/96 | PCT | | | Roke Manor Research Ltd. |
| | | 9 | 6 | 1 | 0 | 3 | 0 | 5 | 04/04/96 | PCT | | | Nokia |
| | | 9 | 5 | 2 | 4 | 1 | 0 | 2 | 09/08/95 | PCT | | | Nokia |
| | | 9 | 5 | 0 | 7 | 5 | 7 | 8 | 03/16/95 | PCT | | | Qualcomm |
| | | 0 | 7 | 8 | 2 | 3 | 6 | 4 | 07/02/97 | EP | | | LSI Logic Corporation |
| | | | | | | | | | | | | | |
| | | | | | | | | | | | | | |

Signed and Sealed this

Nineteenth Day of October, 1999

Attest:

Q. TODD DICKINSON

*Attesting Officer*   *Acting Commissioner of Patents and Trademarks*